United States Patent
Shimura et al.

(10) Patent No.: US 10,495,340 B2
(45) Date of Patent: Dec. 3, 2019

(54) INVERTER CIRCUIT, AND AIR CONDITIONER AND REFRIGERATOR USING THE SAME

(71) Applicant: SAMSUNG ELECTRONICS CO., LTD., Suwon-si, Gyeonggi-do (KR)

(72) Inventors: Tatsuhisa Shimura, Minoo (JP); Shokichi Sugiyama, Minoo (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 307 days.

(21) Appl. No.: 15/509,052

(22) PCT Filed: Jun. 12, 2015

(86) PCT No.: PCT/KR2015/005947
§ 371 (c)(1),
(2) Date: Mar. 6, 2017

(87) PCT Pub. No.: WO2016/035982
PCT Pub. Date: Mar. 10, 2016

(65) Prior Publication Data
US 2017/0264186 A1    Sep. 14, 2017

(30) Foreign Application Priority Data

Sep. 5, 2014 (JP) ................................ 2014-181159
Jun. 12, 2015 (KR) ........................ 10-2015-0083318

(51) Int. Cl.
*F24F 11/89* (2018.01)
*H02M 1/14* (2006.01)
(Continued)

(52) U.S. Cl.
CPC ............ *F24F 11/89* (2018.01); *F25B 49/022* (2013.01); *H02M 1/14* (2013.01); *H02M 1/143* (2013.01);
(Continued)

(58) Field of Classification Search
CPC combination set(s) only.
See application file for complete search history.

(56) References Cited

U.S. PATENT DOCUMENTS 4,788,485 A * 11/1988 Kawagishi ............ H02M 1/425
                                                      318/807
4,973,896 A * 11/1990 Shiga .................... H02J 7/1438
                                                      290/40 C
(Continued)

FOREIGN PATENT DOCUMENTS

EP        1715567 A2    10/2006
JP       08-087932 A     4/1996
(Continued)

OTHER PUBLICATIONS

International Search Report dated Aug. 28, 2015 in corresponding International Application No. PCT/KR2015/005947.
(Continued)

*Primary Examiner* — Emily P Pham
(74) *Attorney, Agent, or Firm* — Staas & Halsey LLP

(57) ABSTRACT

Disclosed are an inverter circuit, and air conditioner and refrigerator using the same. The inverter circuit includes a rectifier configured to rectify an input Alternating-Current (AC) voltage into a Direct-Current (DC) voltage; a smoothing portion configured to smoothen the DC voltage output from the rectifier; an inverter connected to a load, and configured to convert the DC voltage smoothened by the smoothing portion into an AC voltage, and to output the AC voltage to the load; and a suppressor installed between the rectifier and the smoothing portion, and configured to suppress an overvoltage or overcurrent of a DC link to which the DC voltage from the smoothing portion is applied.

10 Claims, 20 Drawing Sheets

(51) Int. Cl.
F25B 49/02 (2006.01)
H02M 1/32 (2007.01)
H02M 5/458 (2006.01)
H02M 7/06 (2006.01)

(52) U.S. Cl.
CPC ............. *H02M 1/32* (2013.01); *H02M 5/458* (2013.01); *H02M 5/4585* (2013.01); *H02M 7/062* (2013.01); *F25B 49/025* (2013.01); *F25B 2600/021* (2013.01); *Y02B 30/741* (2013.01)

(56) References Cited

U.S. PATENT DOCUMENTS

| | | | | |
|---|---|---|---|---|
| 6,075,328 | A * | 6/2000 | Notohara | H02M 5/458 318/400.01 |
| 6,657,841 | B1 | 12/2003 | Melchert et al. | |
| 7,646,165 | B2 * | 1/2010 | Ueda | H02M 5/458 318/801 |
| 7,907,427 | B2 * | 3/2011 | Sakakibara | H02M 5/458 363/37 |
| 8,274,803 | B2 * | 9/2012 | Swamy | H02J 7/045 318/140 |
| 8,289,037 | B2 * | 10/2012 | Labib | G01R 19/0092 323/277 |
| 2009/0224704 | A1 * | 9/2009 | Ibori | H02M 5/458 318/376 |
| 2014/0328091 | A1 * | 11/2014 | Sakakibara | H02M 5/458 363/37 |
| 2015/0116874 | A1 * | 4/2015 | Jean Charles | H02H 9/04 361/56 |

FOREIGN PATENT DOCUMENTS

| | | |
|---|---|---|
| JP | 2010-110179 A | 5/2010 |
| JP | 2012-235632 A | 11/2012 |

OTHER PUBLICATIONS

Written Opinion dated Aug. 28, 2015 in corresponding International Application No. PCT/KR2015/005947.

* cited by examiner

SECOND SIMULATION MODEL

INVERTER CIRCUIT, AND AIR CONDITIONER AND REFRIGERATOR USING THE SAME

CROSS-REFERENCE TO RELATED APPLICATIONS

This application is a U.S. National Stage Application, which claims the benefit under 35 U.S.C. § 371 of PCT International Patent Application No. PCT/KR2015/005947, filed Jun. 12, 2015, which claims the foreign priority benefit under 35 U.S.C. § 119 of Japanese Patent Application No. 2014-181159, filed Sep. 5, 2014 and Korean Patent Application No. 10-2015-0083318, filed Jun. 12, 2015, the contents of which are incorporated herein by reference.

TECHNICAL FIELD

The present invention relates to an inverter circuit, and an air conditioner and a refrigerator using the same.

BACKGROUND ART

An inverter circuit used to control a motor, etc. converts a commercial Alternating-Current (AC) voltage into a Direct-Current (DC) voltage by a diode bridge, smoothens pulsating waves remaining in the converted DC voltage by a smoothing condenser, and inputs the smoothened DC voltage to an inverter to convert the DC voltage into an AC voltage.

Typically, the DC voltage is smoothened until the amplitude of pulsating waves little remains in the DC voltage input to the inverter, in order to prevent pulsating waves remaining in an AC voltage that is applied to the motor, etc. from adversely influencing the control of the motor, etc. For this reason, a smoothing condenser having large capacitance and a large volume is used.

However, a switching control method of preventing pulsating waves remaining in a DC voltage from adversely influencing the control of a motor although the amplitude of the pulsating waves is great has been developed, and accordingly, the capacitance of the smoothing condenser does not need to be as large as it was. Accordingly, an electrolytic condenser having large capacitance and a large volume can be replaced by a ceramic condenser or a film condenser having small capacitance and a small volume.

Patent Document 1 discloses an inverter device including: a diode bridge to rectify an input three-phase AC voltage into a DC voltage; an inverter unit to convert the DC voltage converted by the diode bridge into an AC voltage, and to output the AC voltage; an LC filter including an inductor Ldc connected between an output terminal of the diode bridge and an input terminal of a converter, and a condenser Cdc connected between input terminals of the inverter unit; a voltage detector to detect a voltage applied at both terminals of the inductor Ldc; and a controller to control the inverter unit, wherein the controller controls the inverter unit based on the voltage applied at both terminals of the inductor Ldc, detected by the voltage detector, so that the transfer characteristics of the input/output voltage of the inverter unit become a first order lag system.

Patent Document 2 discloses a power conversion apparatus including: a rectifier circuit configured with a diode device, and configured to rectify an AC voltage of a commercial frequency and to output the AC voltage to DC buses; an inverter configured with a semiconductor switching device, and configured to convert a voltage of the DC buses into AC, and to supply the AC to a load; a voltage clamp circuit configured with a series body of a resistor and a switch connected between the DC buses; and a switch control circuit configured to close the switch that opens normally when the voltage between the DC bus reaches a predetermined overvoltage or when there is probability that the voltage reaches the predetermined overvoltage in order to prevent the occurrence of a voltage exceeding the predetermined overvoltage between the DC buses.

Patent Document 3 discloses a power conversion circuit, wherein a controller controls opening/closing of a switching relay and switching of switching devices Trp, Ttp, Trn, and Ttn installed in at least two-phase upper and lower arms of a converter circuit connected to a three-phase AC power source and a condenser, closes the switching relay until inrush current can be suppressed after current starts flowing to the converter circuit, and controls switching of the switching devices Trp, Trn, Ttp, and Ttn so that current flows to the one-phase upper and lower arms, and no current flows to the remaining upper and lower arms.

PRIOR ART DOCUMENT (Patent Document 1) Japanese Patent Laid-Open No. 2008-29151

(Patent Document 2) Japanese Patent Laid-Open No. 2010-239736

(Patent Document 3) Japanese Patent Laid-Open No. 2012-235632

Accordingly, in a so-called condenserless (capacitorless) inverter circuit using a smoothing condenser having small capacitance, a problem that was not generated when the capacitance of the smoothing condenser is large occurred. That is, it is apprehended that an overvoltage or overcurrent will be generated at an area (DC link) to which a DC voltage is applied in the inverter circuit. Also, it is apprehended that the inverter circuit will break down by the overvoltage or overcurrent.

DISCLOSURE

Technical Problem

An aspect of the present disclosure is to provide an inverter circuit capable of suppressing the occurrence of an overvoltage or overcurrent in a Direct Current (DC) link.

Technical Solution

In accordance with an aspect of the present disclosure, there is provided an inverter circuit includes a rectifier configured to rectify an input Alternating-Current (AC) voltage into a Direct-Current (DC) voltage; a smoothing portion configured to smoothen the DC voltage output from the rectifier; an inverter connected to a load, and configured to convert the DC voltage smoothened by the smoothing portion into an AC voltage, and to output the AC voltage to the load; and a suppressor installed between the rectifier and the smoothing portion, and configured to suppress an overvoltage or overcurrent of a DC link to which the DC voltage from the smoothing portion is applied.

The rectifier may include an output terminal, and another output terminal connected to a common potential line to set a common potential, the smoothing portion may include an input terminal, and another input terminal connected to the common potential line, and the suppressor may include a DC reactor installed between the output terminal of the rectifier and the input terminal of the smoothing portion, and a series circuit of a resistor and a condenser connected in parallel to the DC reactor.

The suppressor may be constituted by a passive component such as a DC reactor, a resistor, and a condenser, so that the suppression unit can be constructed at a low cost.

The inverter circuit can be miniaturized by using a small-sized electrostatic capacity small in the smoothing portion.

The harmonic current generated by the load can be suppressed by the DC reactor provided in the suppressor and the series circuit of the resistor and the capacitor.

The smoothing portion may include an input terminal, and another input terminal connected to a common potential line, and the suppressor may include: a series circuit of a control switch device and a surge absorber, installed between the input terminal of the smoothing portion and the common potential line; and overvoltage detection means configured to detect the overvoltage when a voltage of the DC link reaches the overvoltage, and to turn on the control switch device.

Thus, the power consumption by the suppressor can be reduced when the inverter circuit is in a normal state.

Further, the surge absorber of the suppressor may be a varistor.

Accordingly, instantaneous power can be easily absorbed.

The discharge start voltage of the surge absorber may smaller than the voltage of the DC link detected as the overvoltage by the overvoltage detection means.

Thus, the overvoltage can be suppressed stably when the overvoltage is detected.

The overvoltage detection means may include a first resistor and a second resistor, connected in series between the DC link and the common potential line; a transistor, a third resistor, and a fourth resistor, connected in series between a driving power source and the common potential line; an amplifier having a positive (+) input terminal connected to a connection point of the first resistor and the second resistor, and an output terminal connected to the transistor; and an overvoltage detection circuit configured with a reference power source connected between a negative (−) input terminal of the amplifier and the common potential line.

The driving power source may drives the amplifier.

The inverter circuit is connected to a three-phase AC power source including an R-phase, a S-phase, a T-phase, and a neutral point, and the suppressor may include a series circuit of a first condenser and a second condenser, connected in parallel to the smoothing portion; a first switch installed between the rectifier and each of the S-phase and the T-phase of the three-phase AC power source; and a series circuit of a second switch and a current-limiting resistor, connected to a connection point of the first condenser and the second condenser in the series circuit, and the neutral point of the three-phase AC power source.

The smoothing portion may include a smoothing condenser, and the capacitance of the first condenser and the second condenser is smaller than the capacitance of the smoothing condenser.

Accordingly, a component lower than the line-to-line voltage of the AC voltage inputted to the first switch and the second switch can be used.

In addition, the harmonic current generated by the load can be suppressed by the DC circuit of the two capacitors provided in the suppressor.

The inverter circuit is connected to a three-phase AC power source including an R-phase, a S-phase, and a T-phase, and the suppressor may include a series circuit of a first condenser and a second condenser, connected in parallel to the smoothing portion; a first switch installed between the rectifier and each of a S-phase and a T-phase of the three-phase AC power source; and a series circuit of a second switch and a current-limiting resistor, connected to any one of the S-phase and the T-shape and a connection point of the first condenser and the second condenser in the series circuit.

Accordingly, the present disclosure can be applied to a case where the input AC voltage is three-phase three-wire type.

In accordance with one aspect of the present disclosure, an air conditioner including a compressor, wherein the compressor may include an inverter circuit, and the inverter circuit may include a rectifier configured to rectify an input Alternating-Current (AC) voltage into a Direct-Current (DC) voltage; a smoothing portion configured to smoothen the DC voltage output from the rectifier; an inverter connected to a load, and configured to convert the DC voltage smoothened by the smoothing portion into an AC voltage, and to output the AC voltage to the load; and a suppressor installed between the rectifier and the smoothing portion, and configured to suppress an overvoltage or overcurrent of a DC link to which the DC voltage from the smoothing portion is applied.

In accordance with one aspect of the present disclosure, a refrigerator including a compressor, wherein the compressor may include an inverter circuit, and the inverter circuit may include: a rectifier configured to rectify an input Alternating-Current (AC) voltage into a Direct-Current (DC) voltage; a smoothing portion configured to smoothen the DC voltage output from the rectifier; an inverter connected to a load, and configured to convert the DC voltage smoothened by the smoothing portion into an AC voltage, and to output the AC voltage to the load; and a suppressor installed between the rectifier and the smoothing portion, and configured to suppress an overvoltage or overcurrent of a DC link to which the DC voltage from the smoothing portion is applied.

Advantageous Effects

According to the present disclosure, an inverter circuit capable of suppressing the occurrence of an overvoltage or overcurrent in a Direct Current (DC) link, and an air conditioner and a refrigerator using the inverter circuit can be provided.

BRIEF DESCRIPTION OF THE DRAWINGS

FIG. 7 shows a current waveform of a power source by the first simulation model.

FIG. 8 shows a current waveform of a power source by the second simulation model.

FIG. 9 shows a current waveform of the power source by the third simulation model corresponding to the inverter circuit to which the first embodiment is applied.

FIG. 15 shows source current for the inverter circuit to which the third embodiment is applied.

BEST MODE

Hereinafter, embodiments of the present disclosure will be described in detail with reference to the accompanying drawings.

First, common factors of the following embodiments will be described.

An inverter circuit according to an embodiment of the present disclosure may be used to supply power to a load such as a motor used in a compressor of an air conditioner, a refrigerator, etc. That is, the inverter circuit converts (rectifies) an alternating-current (AC) voltage supplied from an AC power source into a direct-current (DC) voltage, smoothens the DC voltage, and then converts the smoothened DC voltage into an AC voltage suitable for controlling a load.

Figure 1:
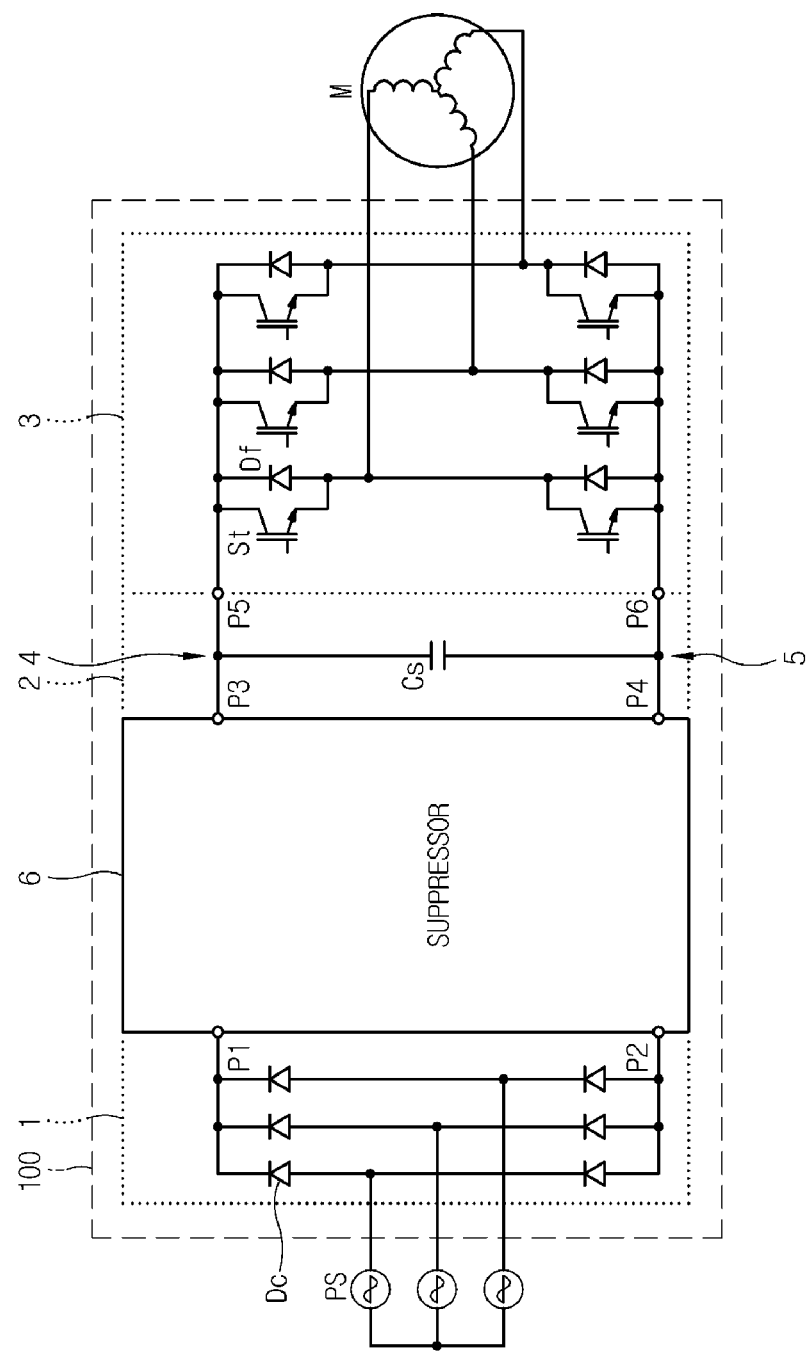
FIG. 1 shows an example of an inverter circuit to which an embodiment of the present disclosure is applied.

FIG. 1 shows an example of an inverter circuit 100 to which an embodiment of the present disclosure is applied.

Herein, an AC power source may be a three-phase AC power source (PS), and a load such as a motor may be a motor M that is controlled by a three-phase AC voltage.

The inverter circuit 100 may include a rectifier 1 to rectify an AC voltage supplied from the three-phase AC power source PS into a DC voltage, and a smoothing portion 2 to smoothen the DC voltage output from the rectifier 1. Also, the inverter circuit 100 may include an inverter 3 to convert the smoothened DC voltage into a three-phase AC voltage, and to supply the three-phase AC voltage to the motor M. Also, the inverter circuit 100 may include a suppressor 6 disposed between the rectifier 1 and the smoothing portion 2. The suppressor 6 may suppress the occurrence of an overvoltage or overcurrent in a DC link 4 to which a DC voltage is applied.

In the inverter circuit 100, the rectifier 1, the suppressor 6, the smoothing portion 2, and the inverter 3 may be connected in this order. That is, the rectifier 1 and the suppressor 6 may be connected to each other through terminals P1 and P2. The suppressor 6 and the smoothing portion 2 may be connected to each other through terminals P3 and P4. The smoothing portion 2 and the inverter 3 may be connected to each other through terminals P5 and P6. The terminals P2, P4, and P6 may be connected to a common potential line 5 to supply a common potential.

Herein, the terminal P1 may be an output terminal of the rectifier 1, and the terminal P2 may be another output terminal of the rectifier 1. Also, the terminal P3 may be an input terminal of the smoothing portion 2, and the terminal P4 may be another input terminal of the smoothing portion 2.

The rectifier 1 may be a diode bridge configured with, for example, 6 rectifier diodes Dc. The 6 rectifier diodes Dc may be connected in a bridge form in order to rectify an AC voltage of each phase supplied from the three-phase AC power source PS into a DC voltage.

The smoothing portion 2 may include a smoothing condenser (smoothing capacitor) Cs. A ceramic condenser or a film condenser having small capacitance and a small volume, instead of an electrolytic condenser having large capacitance and a large volume, may be used. The inverter circuit 100 may be so-called condenserless (capacitorless).

The inverter 3 may include, for example, 6 switching circuits. Each switching circuit may include a switching element St, and a feedback diode Df to make reverse current flow. Also, the inverter 3 may supply a three-phase AC voltage to the motor M by on/off control of the switching element St of each switching circuit.

The inverter 3 may be to control a DC voltage output from the smoothing portion 2 so that the influence of pulsating waves does not appear in the motor M although the amplitude of the pulsating waves is greater than or equal to a predetermined value. Accordingly, although the amplitude of pulsating waves in a DC voltage output from the smoothing portion 2 is great, the motor M can be controlled in the same way as when an electrolytic condenser is used in the smoothing portion 2.

Also, the switching element St may include, for example, an Insulated Gate Bipolar Transistor (IGBT), or the like.

For example, the motor M may be a DC brushless motor. Also, the motor M may use another three-phase AC motor.

The suppressor 6 will be described later. Hereinafter, the suppressor 6 will be referred to as a suppressor 6A and a suppressor 6B to distinguish a plurality of embodiments from each other.

Also, in the smoothing portion 2, an area to which a DC voltage is applied, such as between one terminal of the smoothing condenser Cs and the terminals P3 and P5 connected to the terminal of the smoothing condenser Cs, may be a DC link 4. Also, the other terminal of the smoothing condenser Cs may be connected to the common potential line 5 connected to the terminals P2, P4, and P6. The voltage (that is, a DC link voltage) of the DC link 4 may correspond to a difference between the potential of the common potential line 5 and the potential of the DC link 4.

First Embodiment

Figure 2:
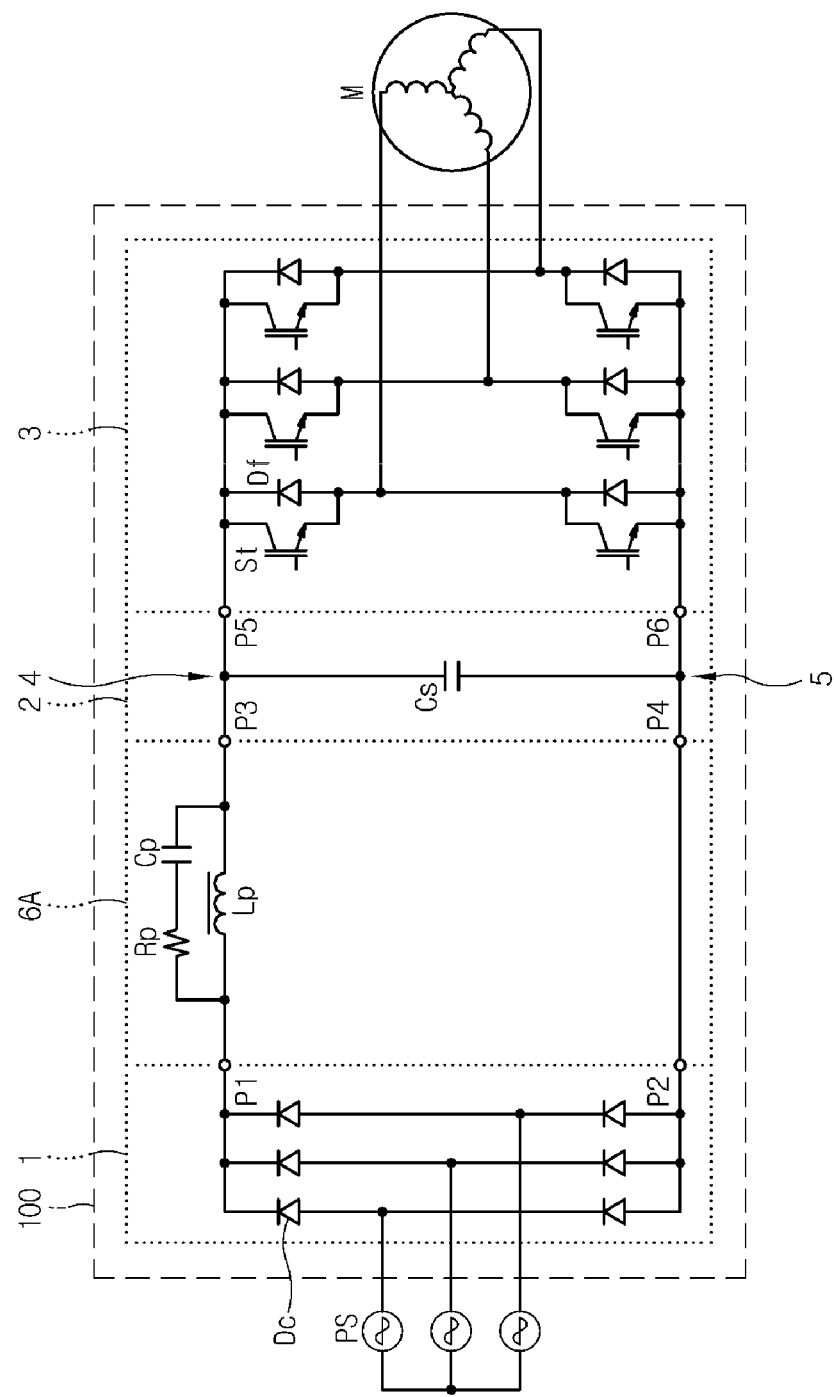
FIG. 2 shows an example of an inverter circuit to which a first embodiment is applied.

FIG. 2 shows an example of an inverter circuit 100 to which a first embodiment is applied.

The inverter circuit 100 according to the first embodiment may include a suppressor 6A as the suppressor 6 shown in FIG. 1. For example, the suppressor 6A may suppress failure of the inverter circuit 100 due to induced electromotive current generated when the motor M stops suddenly. That is, induced electromotive current generated when the motor M stops suddenly may flow through each of the switching circuits constituting the inverter 3. Accordingly, the voltage of the DC link 4 may rise. At this time, if the voltage of the DC link 4 rises to an overvoltage that is higher than or equal to the breakdown voltage of the switching element St, the switching element St may break down. Accordingly, the suppressor 6A may suppress the overvoltage of the DC link 4 when the motor M stops suddenly.

Also, the suppressor 6A may suppress a harmonic current component in source current.

The suppressor 6A may include a DC reactor Lp, a resistor Rp, and a condenser Cp. The DC reactor Lp may be connected between the terminal P1 and the terminal P3. The resistor Rp and the condenser Cp may be a series circuit, and may be connected in parallel to the DC reactor Lp.

For example, the capacitance of the smoothing condenser Cs in the smoothing portion 2 may be preferably in the range of 1 μF to 100 μF, and in the current embodiment, the capacitance of the smoothing condenser Cs in the smoothing portion 2 may be set to 40 μF. The inductance of the DC reactor Lp may be preferably in the range of 1 mH to 10 mH, and in the current embodiment, the inductance of the DC reactor Lp may be set to 2 mH. The resistance of the resistor Rp may be preferably in the range of 50 to 1000, and in the current embodiment, the resistance of the resistor Rp may be set to 150. The capacitance of the condenser Cp may be preferably in the range of 1 μF to 100 μF, and in the current embodiment, the capacitance of the condenser Cp may be set to 10 μF.

Also, the resistance of the resistor Rp and the capacitance of the condenser Cp may be set to appropriate values so that the voltage of the DC link 4 does not exceed the breakdown voltage of the switching element St.

<Suppression of the Overvoltage of the DC Link 4>

Hereinafter, a process in which the overvoltage of the DC link 4 is suppressed by the suppressor 6A in the inverter circuit 100 will be described.

Figure 3:
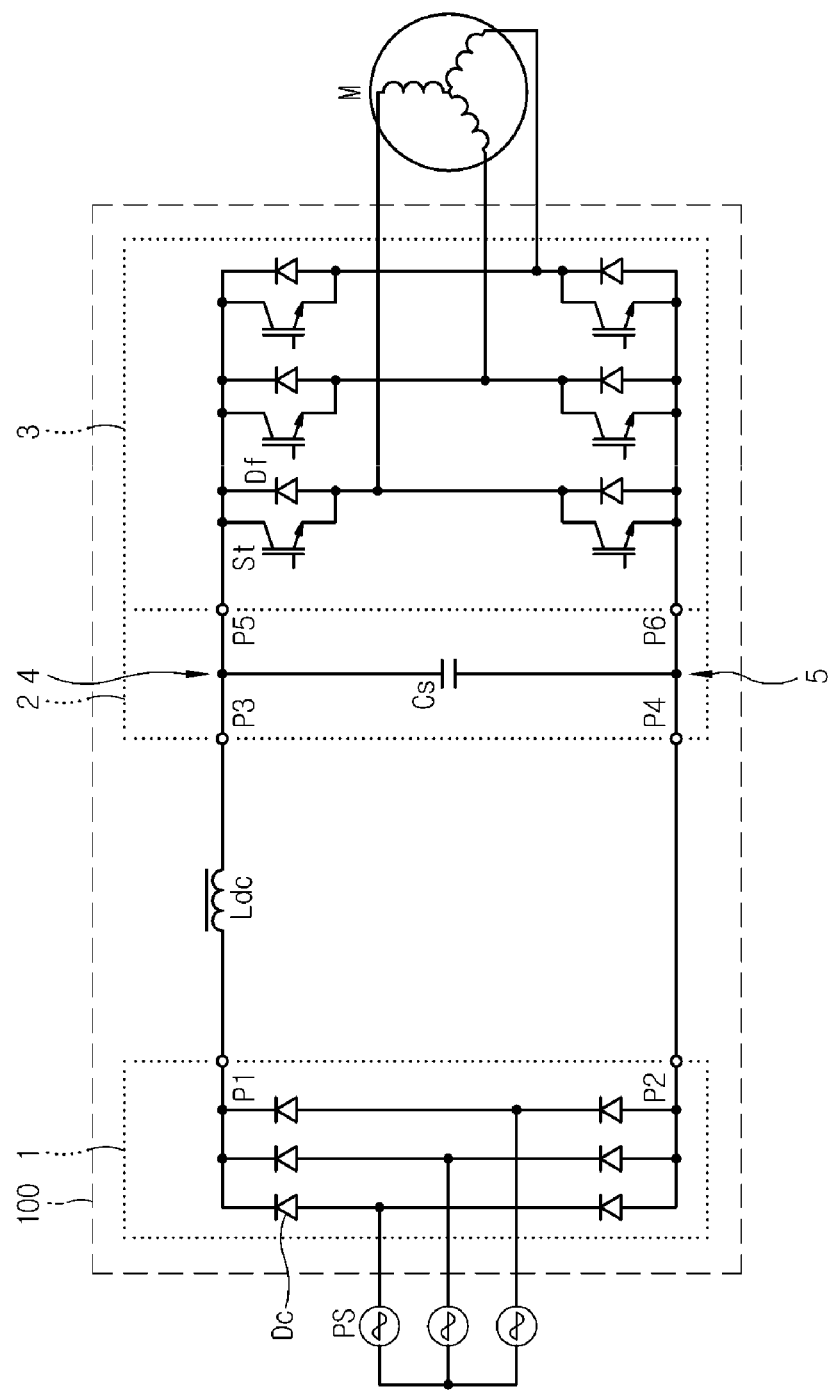
FIG. 3 shows an inverter circuit to which the first embodiment is not applied.

FIG. 3 shows an inverter circuit 100 to which the first embodiment is not applied.

The inverter circuit 100 to which the first embodiment is not applied may include a DC reactor Ldc, instead of the suppressor 6A of the inverter circuit 100 shown in FIG. 2.

Also, the reactance of the DC reactor Ldc may be set to 2 mH.

Since the remaining components are the same as the corresponding ones of the inverter circuit 100 shown in FIG. 2, like reference numerals are assigned to the components, and detailed descriptions thereof will be omitted.

Figure 4:
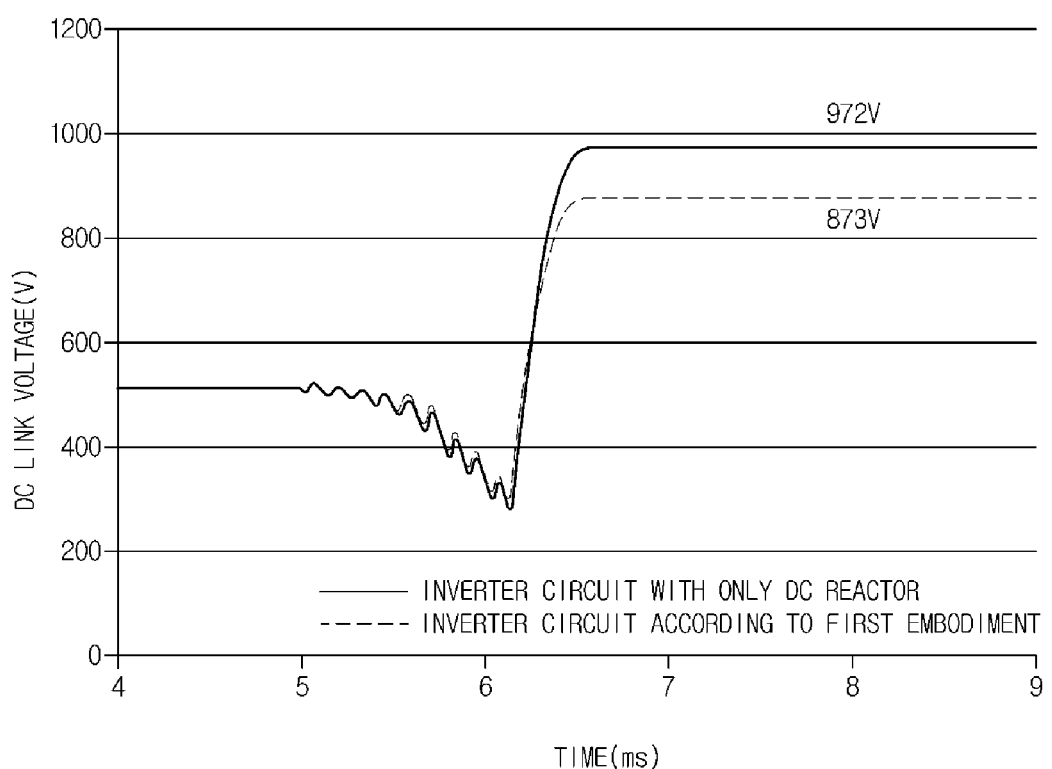
FIG. 4 is a view for comparing the inverter circuit shown in FIG. 2 to which the first embodiment is applied, to the inverter circuit shown in FIG. 3 to which the first embodiment is not applied.

FIG. 4 is a view for comparing the inverter circuit 100 shown in FIG. 2 to which the first embodiment is applied, to the inverter circuit 100 shown in FIG. 3 to which the first embodiment is not applied. FIG. 4 shows the voltage (DC link voltage) of the DC link 4 in regard of a case that there is probability that the voltage of the DC link 4 will rise to the maximum when the motor M stops suddenly. More specifically, FIG. 4 shows the results obtained by simulating the voltage of the DC link 4 after suddenly stopping the motor M around 5 ms. Also, in FIG. 4, the inverter circuit 100 shown in FIG. 3 to which the first embodiment is not applied is denoted as an "inverter circuit with only DC reactor Ldc".

As shown in FIG. 4, in the inverter circuit 100 to which the first embodiment is applied, the DC link voltage rises to 873V. In contrast, in the inverter circuit (inverter circuit 100 with only the DC reactor Ldc) to which the first embodiment is not applied, the DC link voltage rises to 972V. That is, the suppressor 6 of the inverter circuit 100 suppresses the voltage of the DC link 4 by about 100V.

Figure 5:
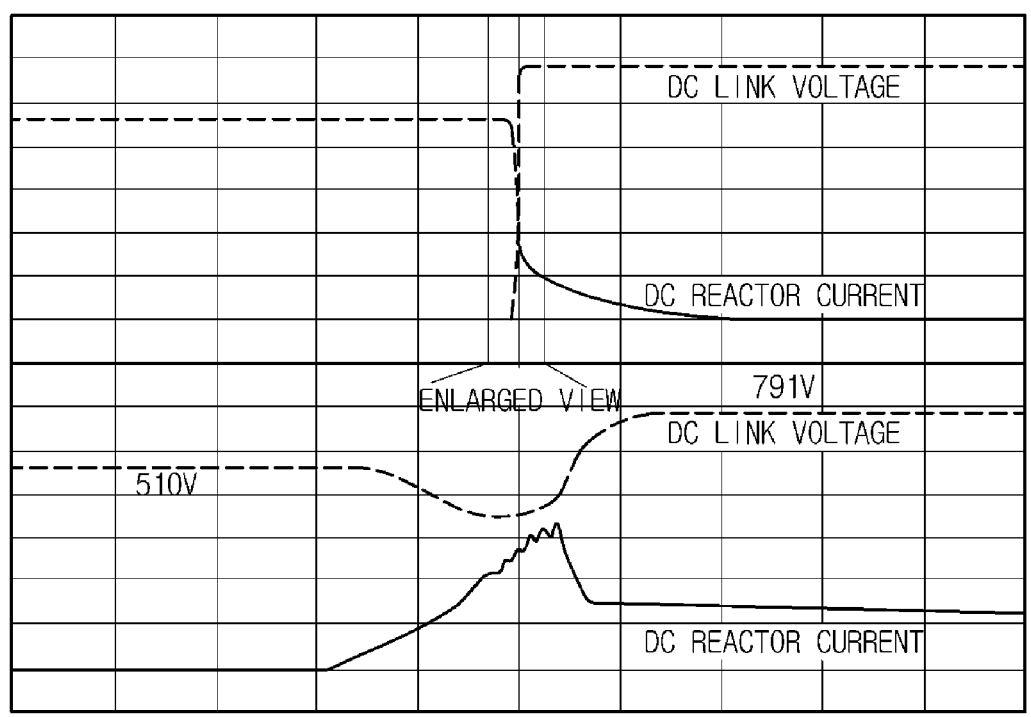
FIG. 5 shows the results of actual measurement by a real tester on the inverter circuit to which the first embodiment is applied.

FIG. 5 shows the results of actual measurement by a real tester on the inverter circuit 100 to which the first embodiment is applied. The upper part of FIG. 5 shows an entire measurement period when the motor M stops suddenly, and the lower part of FIG. 5 is an enlarged view of the center area of the upper part of FIG. 5, in which the voltage of the DC link 4 rises. FIG. 5 shows the actually measured voltage (DC link voltage) of the DC link 4, and current (DC reactor current) passing through the DC reactor Lp.

Whether the simulation results shown in FIG. 4 can simulate the voltage (DC link voltage) rise of the DC link 4 in the real inverter circuit 100 was checked by a real tester.

FIG. 5 shows the tendency in which the voltage (DC link voltage) of the DC link 4 rises after the motor M stops suddenly. In FIG. 5, it is seen that a DC link voltage of 510V measured before the motor M stops suddenly rises to 791V after the motor M stops suddenly.

The DC link voltage of 791V measured after the motor M stops suddenly is lower than 873V obtained from the simulation results.

As described above, it can be proved that the occurrence of an overvoltage at the DC link 4 is suppressed by installing the suppressor 6A in the inverter circuit 100.

<Suppression of Harmonic Current>

Hereinafter, it will be described that the suppressor 6A of the inverter circuit 100 can suppress harmonic current generated by a change in load of the motor M.

Figure 6:
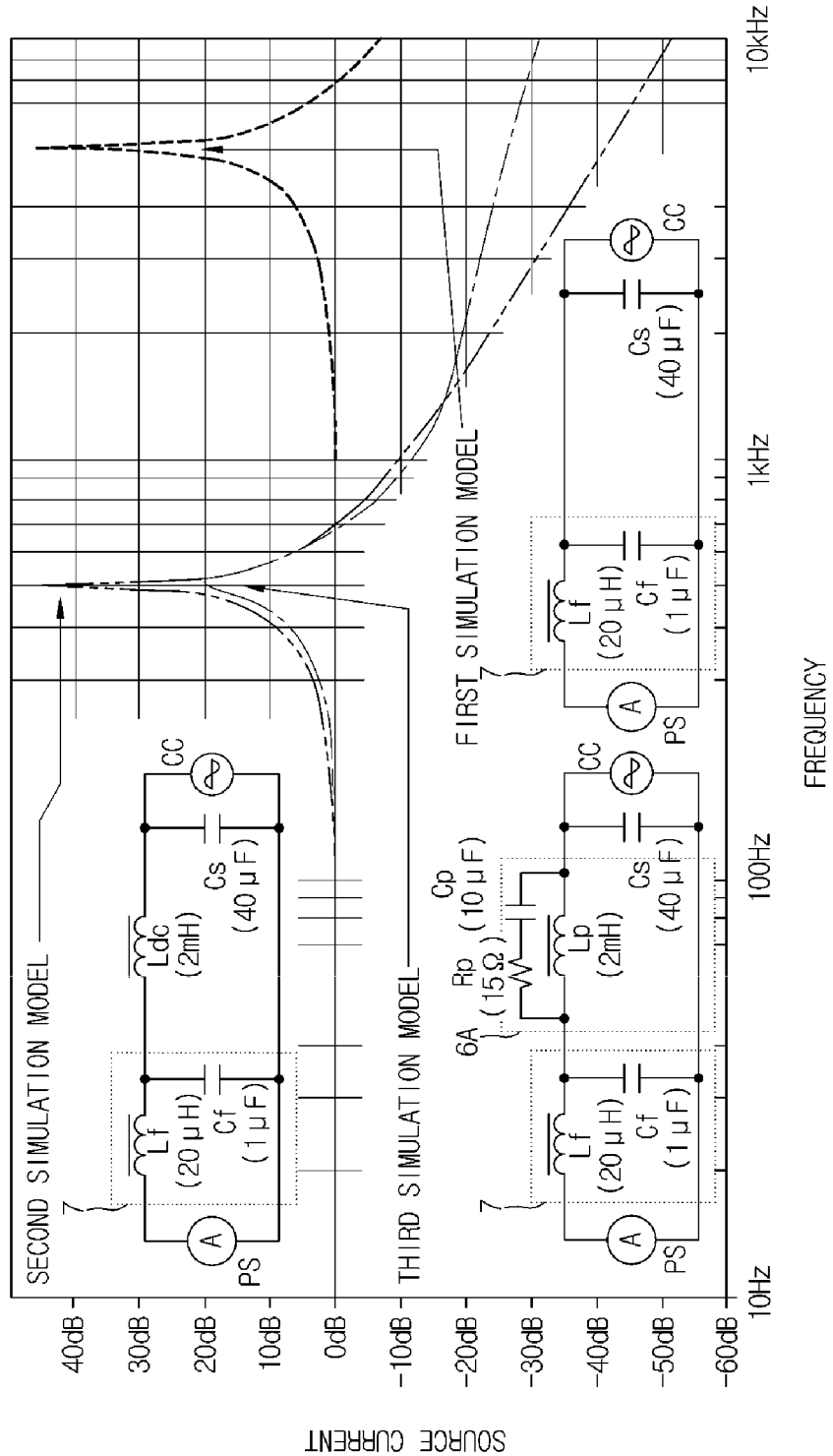
FIG. 6 shows the frequency-response characteristics of source current in regard of three models (simulation models) of the inverter circuit.

FIG. 6 shows the frequency-response characteristics of source current in regard of three models (simulation models) of the inverter circuit 100. Each simulation model adds an Electro-Magnetic Interference (EMI) filter 7 not shown in FIG. 2, and replaces the motor M with a load current source CC.

The EMI filter 7 may be disposed between the rectifier 1 and the suppressor 6, and may include a DC reactor Lf and a condenser Cf. If the suppressor 6 is not provided, the EMI filter 7 may be disposed between the rectifier 1 and the smoothing portion 2.

Herein, for example, the reactance of the DC reactor Lf may be 20 μH, and the capacitance of the condenser Cf may be 1 μF.

Also, in FIG. 6, one phase of three phases of the inverter circuit 100 is extracted and described.

Each simulation model will be described below.

A first simulation model is a model in which the suppressor 6A is omitted in the inverter circuit 100 to which the first embodiment is applied.

A second simulation model includes a DC reactor Ldc, instead of the suppressor 6A of the inverter circuit 100 to which the first embodiment is applied. That is, the second simulation model corresponds to the inverter circuit 100 shown in FIG. 3 to which the first embodiment is not applied.

A third simulation model corresponds to the inverter circuit 100 shown in FIG. 2 to which the first embodiment is applied.

The first simulation model may not include the suppressor 6A, as shown in FIG. 6. Accordingly, a LC resonance circuit may be configured with a smoothing condenser Cs, and a DC reactor Lf and a condenser Cf of the EMI filter 7. As described above, the reactance of the DC reactor Lf may be 20 μh, the capacitance of the condenser Cf may be 1 μF, and the capacitance of the smoothing condenser Cs may be 40 μF. Accordingly, a resonance frequency becomes 5.56 kHz.

Since the resonance frequency belongs to a high frequency band compared to the other simulation models, it is impossible to suppress high-frequency band ones of harmonic current components. Accordingly, for example, it is impossible to satisfy harmonic standards of all countries.

The second simulation model installs a DC reactor Ldc, instead of the suppressor 6A of the inverter circuit 100 to which the first embodiment is applied. Accordingly, a LC resonance circuit may be configured with a DC reactor Ldc and a smoothing condenser Cs. As described above, the reactance of the DC reactor Ldc may be 2 mH, and the capacitance of the smoothing condenser Cs may be 40 μF. Accordingly, a resonance frequency may be generated in the range of 100 Hz to 1000 Hz.

Thereby, it is possible to sufficiently suppress high-frequency band components of harmonic current. However, since a high resonance peak appears at the resonance frequency of the LC resonance circuit, low-frequency band components of harmonic current are amplified, which cannot be a sufficient countermeasure against harmonic current.

In regard of this, the third simulation model includes the suppressor 6A in correspondence to the inverter circuit 100 to which the first embodiment is applied. Accordingly, a resonance peak is reduced at the resonance frequency of the LC resonance circuit by the DC reactor Lp and the smoothing condenser Cs, thereby sufficiently lowering low-frequency band components of harmonic current.

That is, the load current source CC becomes a source of harmonic current. Also, the high-frequency band components of the harmonic current may be bypassed by the smoothing condenser Cs. The low-frequency band components of the harmonic current may be suppressed by the DC reactor Lp. Also, current flowing through the LC resonance circuit of the smoothing condenser Cs and the DC reactor Lp may be reduced by a series circuit of a resistor Rp and a condenser Cp.

Hereinafter, a current waveform of a power source by each of the simulation models will be described.

Figure 7A:
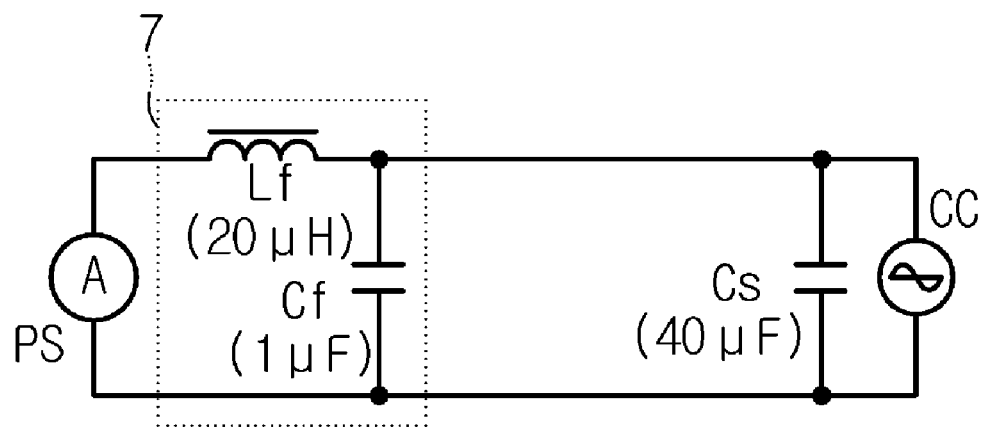
FIG. 7(a) shows the first simulation model.
Figure 7B:
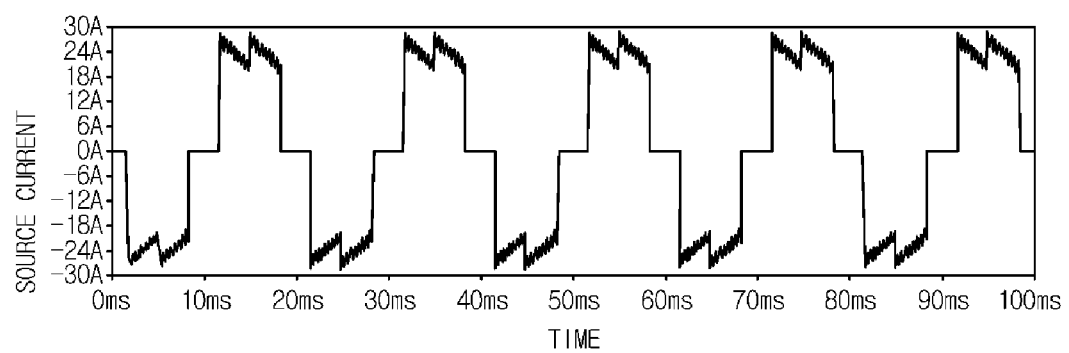
FIG. 7(b) shows the relationship between source current and time.

FIG. 7 shows a current waveform of a power source by the first simulation model. FIG. 7(a) shows the first simulation model, and FIG. 7(b) shows the relationship between source current and time.

The harmonic waves of the high-frequency band shown in FIG. 6A may overlap with the current waveform of a power source, as shown in FIG. 7(b).

Figure 8A:
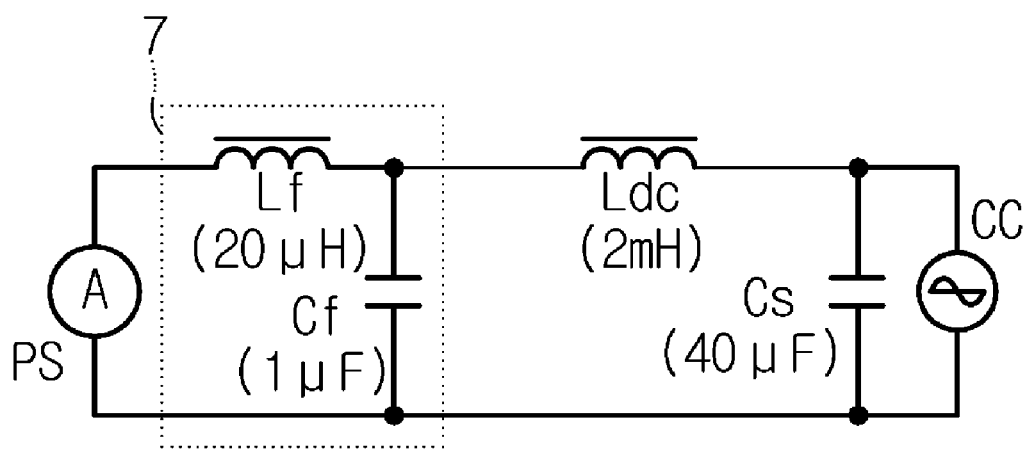
FIG. 8(a) shows the second simulation model.
Figure 8B:
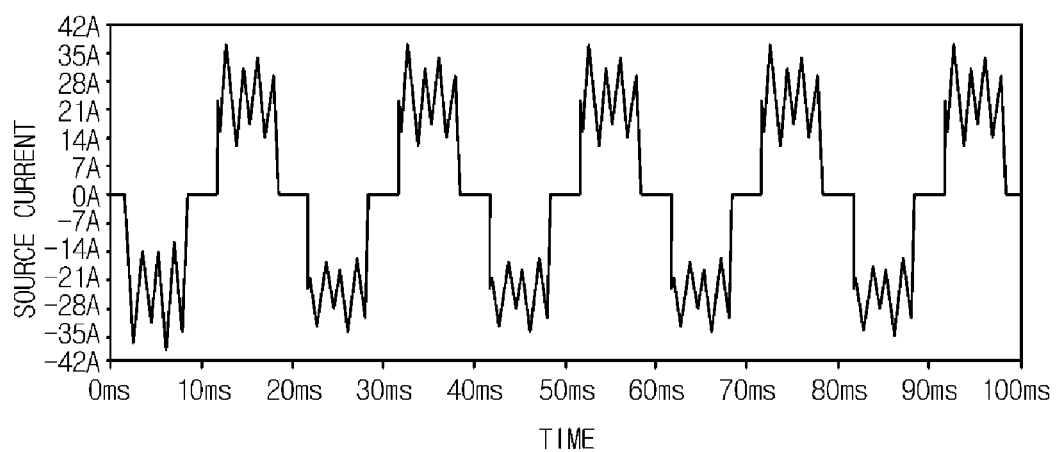
FIG. 8(b) shows the relationship between source current and time.

FIG. 8 shows a current waveform of a power source by the second simulation model. FIG. 8(a) shows the second simulation model, and FIG. 8(b) shows the relationship between source current and time.

In the current waveform of the power source shown in FIG. 8(b), the harmonic waves of the high-frequency band shown in FIG. 7 are suppressed, however, the harmonic waves of the low-frequency band shown in FIG. 6 overlap. Also, the harmonic waves of the low-frequency band may be greater than in the third simulation model which will be described below.

Figure 9A:
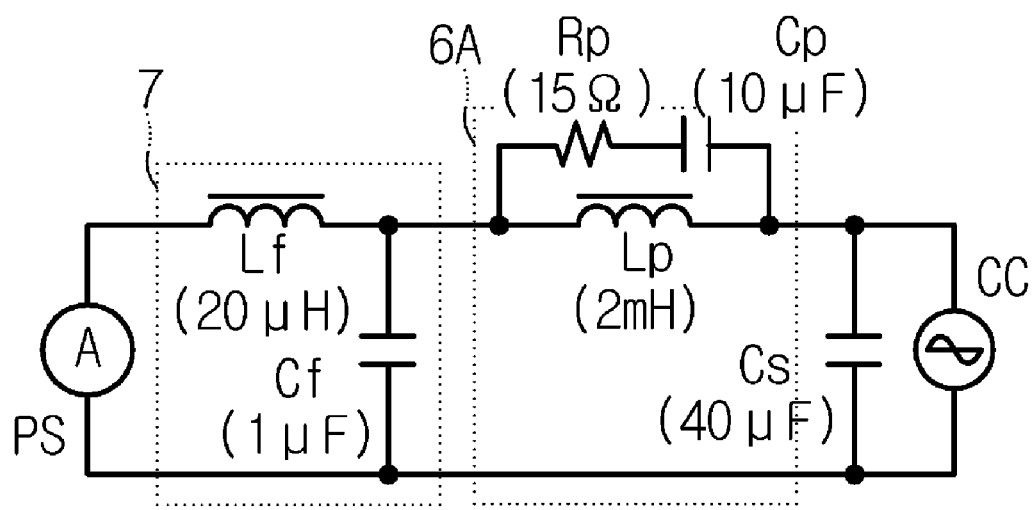
FIG. 9(a) shows the third simulation model.
Figure 9B:
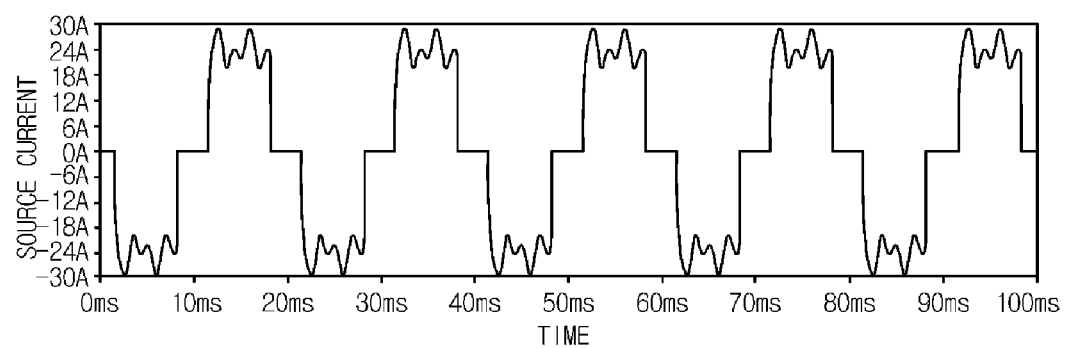
FIG. 9(b) shows the relationship between source current and time.

FIG. 9 shows a current waveform of the power source by the third simulation model corresponding to the inverter circuit 100 to which the first embodiment is applied. FIG. 9(a) shows the third simulation model, and FIG. 9(b) shows the relationship between source current and time.

In the current waveform of a power source shown in FIG. 9B, the amplitude of harmonic waves of a low-frequency band may be reduced compared to the current waveform of FIG. 8.

As described above, in the third simulation model corresponding to the inverter circuit 100 to which the first embodiment is applied, harmonic current in source current is most suppressed.

Hereinafter, the results of measurement on Total Harmonic Current (THC) and Partial Weighted Harmonic Current (PWHC) which are indicators of source harmonic current for each simulation model will be described.

THC and PWHC are calculated by Equation (1) and Equation (2), respectively, below.

$$THC = \sqrt{\sum_{h=2}^{40} Ih^2} \bigg/ Iref, \text{ and} \quad (1)$$

$$PWHC = \sqrt{\sum_{h=14}^{40} h*Ih^2} \bigg/ Iref, \quad (2)$$

where Ih: the amplitude of a current spectrum at the order h, Iref: the amplitude of a current spectrum at the power frequency (h=1), and source frequency: 50 Hz.

Table 1 shows the measured THC and TWHC. In Table 1, THC and PWHC for the three simulation models described above are shown.

TABLE 1

| Model | THC | PWHC |
| --- | --- | --- |
| First Simulation Model | 30.2% | 5.62% |
| Second Simulation Model | 39.0% | 50.0% |
| Third Simulation Model | 31.8% | 50.5% |

In the first simulation model, THC is 30.2% that is the smallest value, and PWHC is 56.2% that is the greatest value. In the second simulation model, THC is 39.0% that is the greatest value, and PWHC is 50.0% that is the smallest value. Meanwhile, in the third simulation model, THC is 31.8% which is close to the smallest value (30.2%), and PWHC is 50.5% which is close to the smallest value (50.0%).

That is, the inverter circuit to which the first embodiment corresponding to the third simulation model is applied can suppress the harmonic current of source current in a balanced way.

The inverter circuit 100 according to the first embodiment may have a compact size since the smoothing portion 2 uses the smoothing condenser Cs having small capacitance and a small volume. In addition, the suppresser 6A may suppress an overvoltage of the DC link 4 due to induced electromotive current generated when the motor M stops suddenly. Accordingly, the voltage of the DC link 4 can be prevented from rising to an overvoltage that is higher than the breakdown voltage of the switching elements St of the inverter 3 so that the inverter circuit 100 breaks down.

Also, the suppressor 6A of the inverter circuit 100 to which the first embodiment is applied may reduce the resonance peak of the LC resonance circuit configured with the smoothing condenser Cs and the DC reactor Lp. Accordingly, the suppresser 6A may reduce harmonic current in source current.

Also, the suppressor 6A may be configured with the DC reactor Lp, and a series circuit of the resistor Rp and the condenser Cp connected in parallel to the DC reactor Lp. That is, the suppressor 6A may be configured with only a passive circuit (a passive component). Accordingly, it is possible to suppress an overvoltage of the DC link 4 generated when the motor M stops suddenly, without using any complicated control circuit (a control logic). Accordingly, the inverter circuit 100 can be manufactured with low costs.

Hereinafter, a modified example of the inverter circuit 100 to which the first embodiment is applied will be described.

In the above-described example, the suppresser 6A is used to suppress the breakdown of the inverter 3. However, the resistance of the resistor Rp and the capacitance of the condenser Cp constituting the suppressor 6A can be set based on the breakdown voltages of the other devices.

Also, the breakdown of the inverter circuit 100 does not necessarily mean the breakdown of the inverter 3. For example, the breakdown of the inverter circuit 100 is a concept containing the case in which any problem occurs by induced electromotive current generated when the motor M stops suddenly so that the inverter circuit 100 cannot accomplish its own functions completely.

In the above description, parameters, such as the resistance of the resistor Rp and the capacitance of the condenser Cp of the suppressor 6A, are set in view of preventing the breakdown. However, for example, the parameters may be set in consideration of suppressing the resonance peak of the LC resonance circuit configured with the smoothing condenser Cs and the DC reactor Lp. Also, the parameters may be set by applying a predetermined weight to both the voltage of the DC link 4 and the resonance peak of the LC resonance circuit.

Second Embodiment

In the inverter circuit 100 to which the first embodiment is applied, the suppressor 6A may be configured with the DC reactor Lp, and the series circuit of the resistor Rp and the condenser Cp connected in parallel to the DC reactor Lp. The suppressor 6A suppresses an overvoltage of the DC link 4 generated when the motor M stops suddenly.

The inverter circuit 100 according to the second embodiment may include a suppressor 6B having a different configuration from that of the suppressor 6A of the inverter circuit 100 to which the first embodiment is applied. The suppressor 6B may suppress an overvoltage of the DC link 4 that is generated when the motor M stops suddenly.

Figure 10:
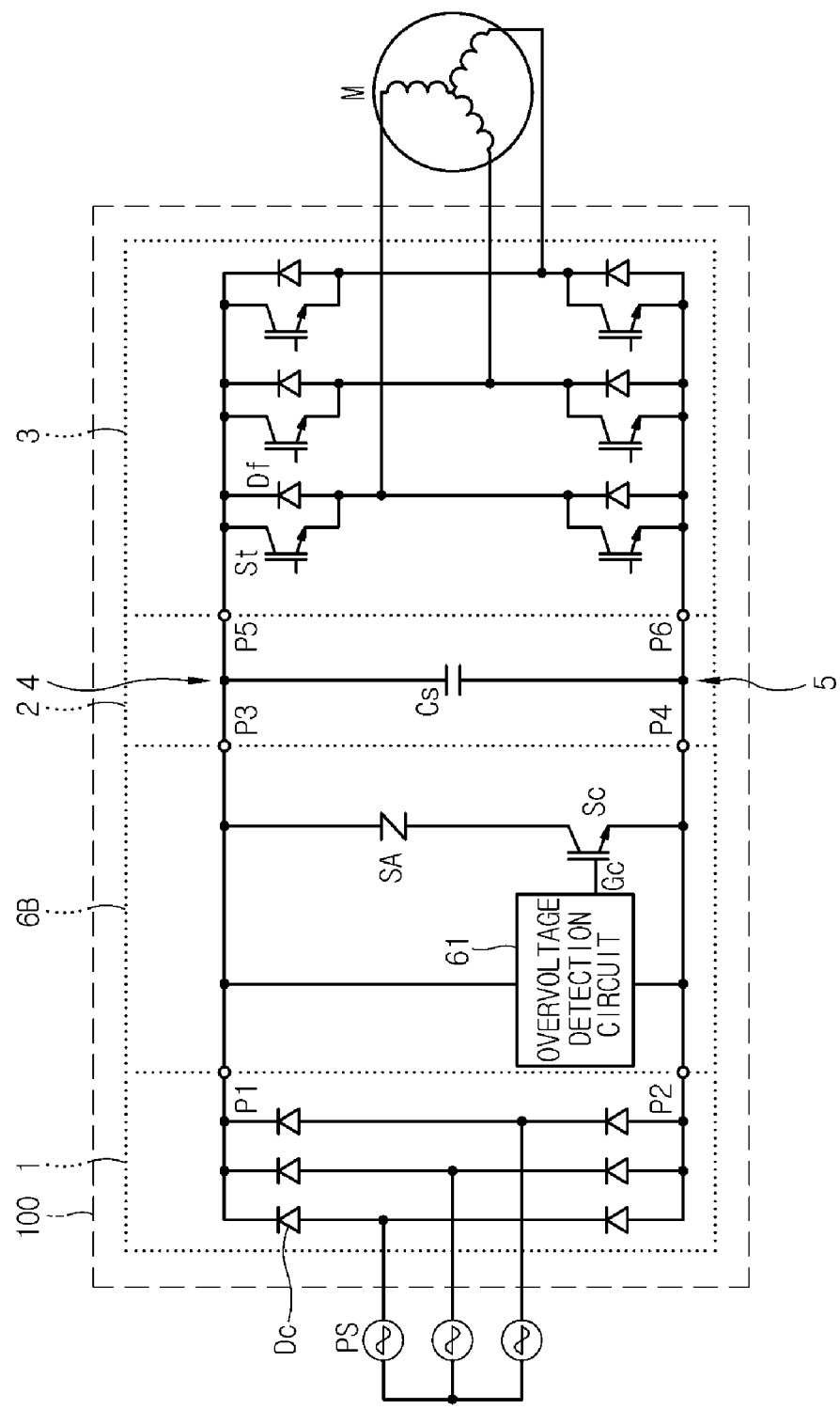
FIG. 10 shows an example of the inverter circuit to which the second embodiment is applied.

FIG. 10 shows an example of the inverter circuit 100 to which the second embodiment is applied.

The inverter circuit 100 to which the second embodiment is applied may include the suppressor 6B as the suppressor 6 of FIG. 1. The same devices as those of the inverter circuit 100 shown in FIG. 1 to which the first embodiment is applied may be assigned the same reference numerals, and detailed descriptions thereof will be omitted. Hereinafter, the suppressor 6B will be described.

The suppressor 6B may include a surge absorber SA, a control switch device Sc, and an overvoltage detection circuit 61 which is an example of overvoltage detection means. The surge absorber SA may be connected in series to the control switch device Sc. The surge absorber SA may be connected to a terminal P3 (a terminal P1), and the control switch device Sc may be connected to a terminal P4 (a terminal P2). The surge absorber SA may be a configuration for mitigating the steepness of abnormal high-voltage progressive waves on a line, and reducing the peak value.

Also, the overvoltage detection circuit 61 may be disposed between the terminal P3 (the terminal P1) and the terminal P4 (the terminal P2) to detect the voltage of the DC link 4.

The surge absorber SA may use, for example, a micro-gap or a varistor using zinc oxide. If a voltage that is higher than or equal to a predetermined voltage (a discharge start voltage) is applied to the varistor, the varistor may change to a turned-on state from a turned-off state to immediately flow current therethrough. The varistor may have great power absorption (great energy absorption), and can absorb instantaneous power accompanied by discharging although large current flows instantaneously by discharging at the discharge start voltage or more.

The control switch device Sc, which is, for example, IGBT, may change to a turned-on state from a turned-off state when a predetermined voltage is applied to the control gate Gc.

The overvoltage detection circuit 61 may determine whether the voltage of the DC link 4 exceeds a predetermined detection voltage. If the overvoltage detection circuit 61 determines that the voltage of the DC link 4 exceeds the predetermined detection voltage, the overvoltage detection circuit 61 may supply a voltage for changing the control switch device Sc from the turned-off state to the turned-on state, to the control gate Gc.

Also, the discharge start voltage of the surge absorber SA may be set to be lower than the detection voltage of the overvoltage detection circuit 61.

Hereinafter, the operation of the suppressor 6B will be described.

Referring to FIG. 10, when the inverter circuit 100 operates normally, the voltage of the DC link 4 may be lower than or equal to the detection voltage of the overvoltage detection circuit 61. In this case, the overvoltage detection circuit 61 may supply a voltage for maintaining the control switch device Sc at the turned-off state, to the control gate Gc. Since the control switch device Sc is in the turned-off state, no current may flow through the surge absorber SA connected in series to the control switch device Sc.

When the motor M stops suddenly, the voltage of the DC link 4 may rise to exceed the detection voltage. Then, the overvoltage detection circuit 61 may supply a voltage for changing the control switch device Sc from the turned-off state to the turned-on state, to the control gate Gc. Accordingly, the control switch device Sc may be turned on, and the voltage of the DC link 4 may be applied to the series circuit of the control switch device Sc and the surge absorber SA. At this time, the voltage of the DC link 4 may be distributed to the control switch device Sc and the surge absorber SA. The resistance of the control switch device Sc in the turned-on state may be smaller than the resistance of the surge absorber SA. Accordingly, the major part of the voltage of the DC link 4 may be applied to the surge absorber SA.

At this time, since the voltage applied to the surge absorber SA exceeds the discharge start voltage of the surge absorber SA, the surge absorber SA may change from the turned-off state to the turned-on state. Also, current may flow from the DC link 4 toward the common potential line 5 via the surge absorber SA and the control switch device Sc to lower the voltage of the DC link 4

Also, if the voltage of the DC link 4 is lower than or equal to the detection voltage, the overvoltage detection circuit 61 may supply a voltage for changing the control switch device Sc from the turned-on state to the turned-off state, to the control gate Gc. Accordingly, the control switch device Sc may change from the turned-on state to the turned-off state, and the surge absorber SA may also change from the turned-on state to the turned-off state. Then, current flowing from the DC link 4 toward the common potential line 5 through the surge absorber SA and the control switch device Sc may be blocked. Then, the voltage of the DC link 4 may be not influenced by the suppressor 6B.

That is, if the voltage of the DC link 4 exceeds the detection voltage, the overvoltage detection circuit 61 may operate the suppressor 6B, and if the voltage of the DC link 4 is lower than or equal to the detection voltage, the overvoltage detection circuit 61 may stop operating the suppressor 6B.

Also, instead of using the surge absorber SA, a method of installing the control switch device Sc between the DC link 4 and the common potential line 5 can be considered. However, if the voltage of the DC link 4 rises to an overvoltage so as to change the control switch device Sc from the turned-off state to the turned-on state, great instantaneous power may flow from the DC link 4 to the common potential line 5. If the control switch device Sc absorbs the instantaneous power, the control switch device Sc may escape from a stable operation area so as to break down.

Also, instead of using the control switch device Sc, a method of installing the surge absorber SA between the DC link 4 and the common potential line 5 can be considered. However, the surge absorber SA such as a varistor may cause great leakage current compared to the control switch device Sc. For this reason, the surge absorber SA may consume power even when it is in the turned-off state.

Also, it may be necessary to select the surge absorber SA of a discharge start voltage corresponding to the overvoltage of the DC link 4 to need to be suppressed. For example, when a line-to-line voltage of the three-phase AC power source PS is 220V, the voltage of the DC link 4 in a normal state may be about 540V. In this case, in order to operate the surge absorber SA when the voltage of the DC link 4 reaches 600V, the surge absorber SA having a discharge voltage of 600V may be used.

Accordingly, in the inverter circuit 100 to which the second embodiment is applied, the series circuit of the surge absorber SA and the control switch device Sc may be used. In the normal state, that is, when the voltage of the DC link 4 is lower than or equal to the detection voltage, no current may flow through the series circuit of the surge absorber SA and the control switch device Sc. Accordingly, in the normal state, power consumption may be suppressed.

Meanwhile, when the voltage of the DC link 4 exceeds the detection voltage, the control switch device Sc may change from the turned-off state to the turned-on state to change the surge absorber SA to the turned-on state. Accordingly, it is possible to set the discharge start voltage of the surge absorber SA independently from the detection voltage for detecting the overvoltage of the DC link 4. For example, if the detection voltage of the overvoltage detection circuit 61 is set to 600V, the surge absorber SA having a discharge start voltage of 450V that is lower than the detection voltage of 600V may be used. By setting the discharge start voltage (450V) to be lower than the voltage (600V) for operating the suppressor 6B, it is possible to definitely operate the surge absorber SA.

Also, since the surge absorber SA has high capability (power absorption) of absorbing instantaneous power, the surge absorber SA will not easily break down by instantaneous power.

Figure 11:
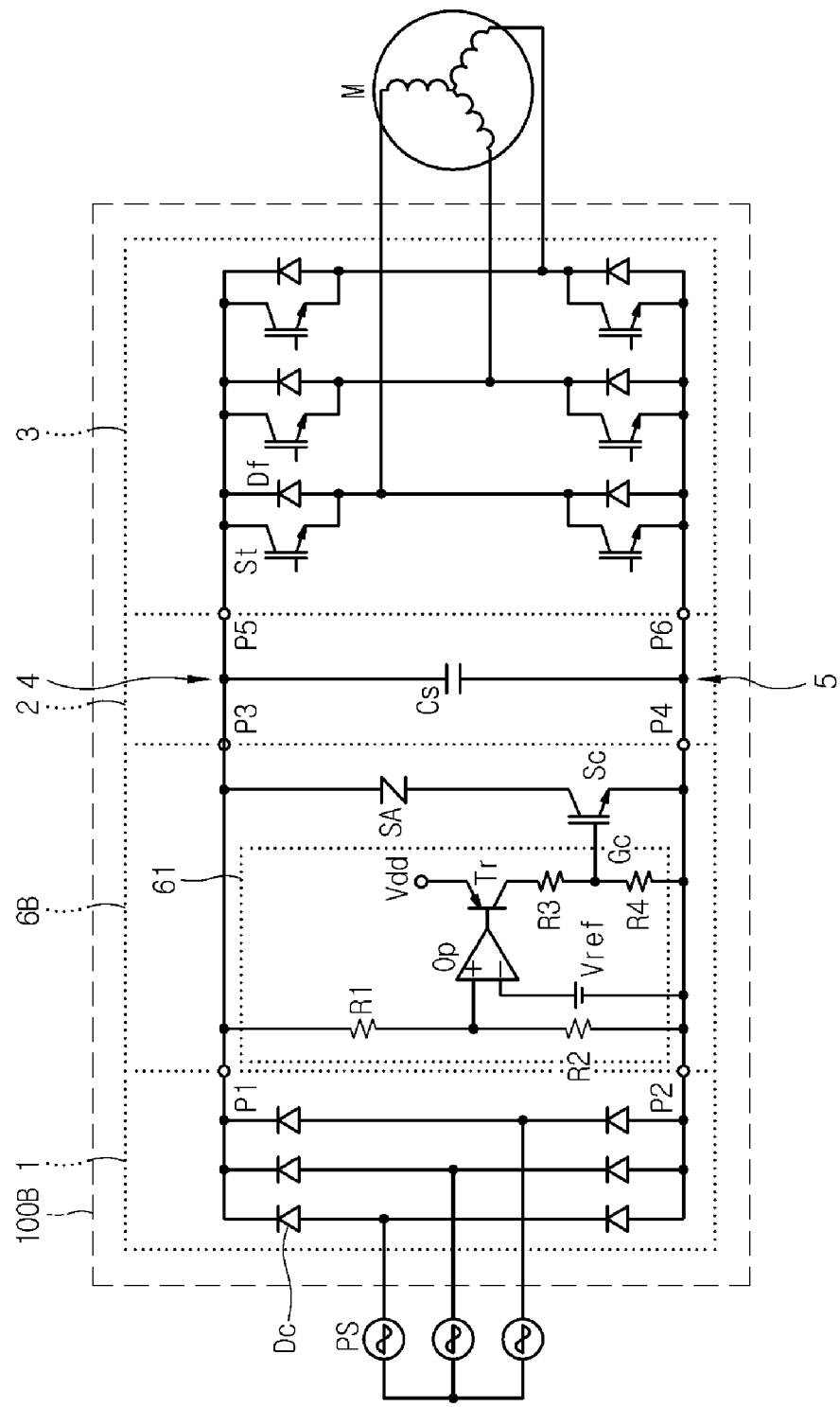
FIG. 11 shows an example of the overvoltage detection circuit in the suppressor of the inverter circuit to which the second embodiment is applied.

FIG. 11 shows an example of the overvoltage detection circuit 61 in the suppressor 6B of the inverter circuit 100 to which the second embodiment is applied.

Hereinafter, the same components as the corresponding ones of the inverter circuit 100 shown in FIG. 10 to which the second embodiment is applied are assigned the same reference numerals, and detailed descriptions thereof will be omitted. Hereinafter, the overvoltage detection circuit 61 of the suppressor 6B will be described.

The overvoltage detection circuit 61 may include resistors R1, R2, R3, and R4, an amplifier Op, a transistor Tr, and a reference power source Vref. The amplifier Op (hereinafter, referred to as a differential amplifier) may be a differential amplifier, and the transistor Tr may be a pnp bipolar transistor (hereinafter, referred to as a pnp bipolar transistor).

The resistor R1 and the resistor R2 may be connected in series to each other, and connected between the DC link 4 and the common potential line 5.

The pnp bipolar transistor Tr, the resistor R3, and the resistor R4 may be connected in series to each other, in this order, and connected between a driving power source Vdd and the common potential line 5.

The differential amplifier Op may include a positive (+) input terminal, a negative (−) input terminal, and an output terminal to output a voltage corresponding to a difference between a voltage of the positive (+) input terminal and a voltage of the negative (−) input terminal. Herein, the positive (+) input terminal of the differential amplifier Op may be connected to a connection point between the resistor R1 and the resistor R2, and the negative (−) input terminal of the differential amplifier Op may be connected to a terminal of the reference power source Vref. Also, the output terminal of the differential amplifier Op may be connected to the base terminal of the pnp bipolar transistor Tr.

The other terminal of the reference power source Vref may be connected to the common potential line 5.

The voltage of the driving power source Vdd may be, for example, DC15V. Also, the driving power source Vdd may be used as a power source for driving the differential amplifier Op.

Also, the voltage of the reference power source Vref may be, for example, DC2.5V.

Hereinafter, the operation of the overvoltage detection circuit 61 will be described.

The voltage of the DC link 4 may be distributed by the resistor R1 and the resistor R2. The distributed voltage may be input to the positive (+) input terminal of the differential amplifier Op. Also, the differential amplifier Op may compare the distributed voltage of the DC link 4 which is the voltage of the positive (+) input terminal, to the voltage of the reference power source Vref which is the voltage of the negative (−) input terminal. That is, the detection voltage of the overvoltage detection circuit 61 may be set to the voltage distributed by the resistor R1 and the resistor R2.

First, a case in which the voltage of the DC link 4 is lower than or equal to the detection voltage, that is, a case in which the inverter circuit 100 is in a normal state will be described. In this case, the voltage (that is, the voltage of the positive (+) input terminal of the differential amplifier Op) distributed by the resistor R1 and the resistor R2 may be lower than or equal to the voltage (that is, the voltage of the negative (−) input terminal of the differential amplifier Op) of the reference power source Vref. Then, the differential amplifier Op may output a voltage for maintaining the pnp bipolar transistor Tr in a turned-off state, from the output terminal. If the pnp bipolar transistor Tr is in the turned-off state, the control gate Gc of the control switch device Sc may become the potential (common potential) of the common potential line 5. Accordingly, the control switch device Sc may be in the turned-off state, and the surge absorber SA may also be in the turned-off state.

Meanwhile, a case in which the voltage of the DC link 4 exceeds the detection voltage, that is, a case in which the inverter circuit 100 is abnormal will be described. In this case, the voltage (that is, the voltage of the positive (+) input terminal of the differential amplifier Op) distributed by the resistor R1 and the resistor R2 may exceed the voltage (that is, the voltage of the negative (−) input terminal of the differential amplifier Op) of the reference power source Vref. Then, the differential amplifier Op may output a voltage for changing the pnp bipolar transistor Tr from the turned-off state to the turned-on state, from the output terminal. Accordingly, the pnp bipolar transistor Tr may change from the turned-off state to the turned-on state. Then, the voltage of the control gate Gc of the control switch device Sc may become a voltage distributed from the voltage of the driving power source Vdd by the resistor R3 and the resistor R4. The distributed voltage may be set to a voltage for changing the control switch device Sc from the turned-off state to the turned-on state. Accordingly, the control switch device Sc may change from the turned-off state to the turned-on state, and the surge absorber SA may also change from the turned-off state to the turned-on state. Then, current may flow from the DC link 4 toward the common potential line 5. Accordingly, the voltage of the DC link 4 may be lowered.

If the voltage of the DC link 4 becomes lower than or equal to the detection voltage, the voltage (the voltage of the positive (+) input terminal of the differential amplifier Op) distributed by the resistor R1 and the resistor R2 of the DC link 4 may become lowered to be lower than or equal to the voltage of the reference power source Vref. Also, the voltage of the output terminal of the differential amplifier Op may change to a voltage for changing the pnp bipolar transistor Tr from the turned-on state to the turned-off state. Accordingly, the pnp bipolar transistor Tr may change from the turned-on state to the turned-off state. Also, the voltage of the control gate Gc may change to a voltage for changing the control switch device Sc from the turned-on state to the turned-off state. Accordingly, the control switch device Sc may change from the turned-on state to the turned-off state, and the surge absorber SA may also change from the turned-on state to the turned-off state.

The overvoltage detection circuit 61 may require high breakdown voltage components for the resistors R1 and R2 of distributing the voltage of the DC link 4. However, the differential amplifier Op, the pnp bipolar transistor Tr, and the resistors R3 and R4 can use general-purpose components of low breakdown voltage. Also, the control switch device Sc can use general-purpose components of low breakdown voltage. Accordingly, the inverter circuit 100 can be manufactured with low costs.

The overvoltage detection circuit 61 using the differential amplifier Op has been described above. However, the overvoltage detection circuit 61 may be configured in a different way. For example, the overvoltage detection circuit 61 may use a circuit called a shunt regulator.

Figure 12:
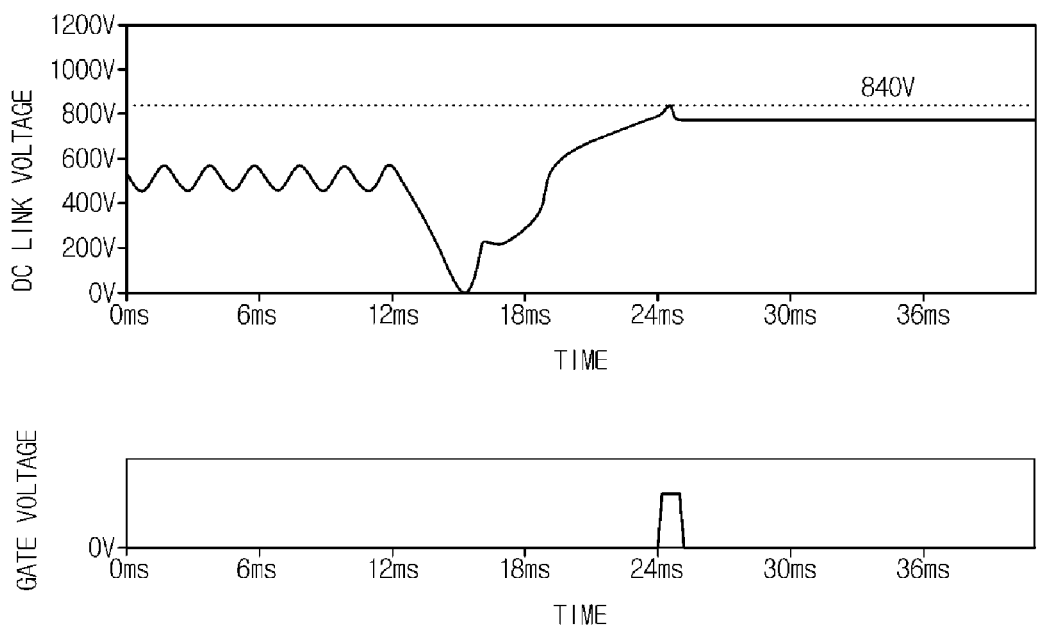
FIG. 12 shows an example of the voltage of the DC link in the inverter circuit to which the second embodiment is applied.

FIG. 12 shows an example of the voltage of the DC link 4 in the inverter circuit 100 to which the second embodiment is applied. The upper part of FIG. 12 shows the relationship between the voltage (DC link voltage) of the DC link and time, and the lower part of FIG. 12 shows the relationship between the voltage (gate voltage) of the control gate Gc and time.

In FIG. 12, the motor M may stop suddenly at time of 12 ms. Then, the DC link voltage may be lowered sharply, and then rise by induced electromotive current. If the DC link voltage exceeds 800V (at time of 24 ms), the overvoltage detection circuit 61 may operate. The overvoltage detection circuit 61 may apply a voltage for changing the control switch device Sc from the turned-off state to the turned-on state, to the control gate Gc. Accordingly, the control switch device Sc may change from the turned-off state to the turned-on state, and the surge absorber SA may change from the turned-off state to the turned-on state. Then, current may flow to the common potential line 5 from the DC link 4 through the surge absorber SA and the control switch device Sc, so as to lower the DC link voltage.

If the DC link voltage is lowered (at time of 25 ms), the overvoltage detection circuit 61 may apply a voltage for changing the control switch device Sc from the turned-on state to the turned-off state, to the control gate Gc. Accordingly, the control switch device Sc may change from the turned-on state to the turned-off state, and simultaneously, the surge absorber SA may also change from the turned-on state to the turned-off state.

In this case, the maximum value of the DC link voltage may be 840V.

Figure 13:
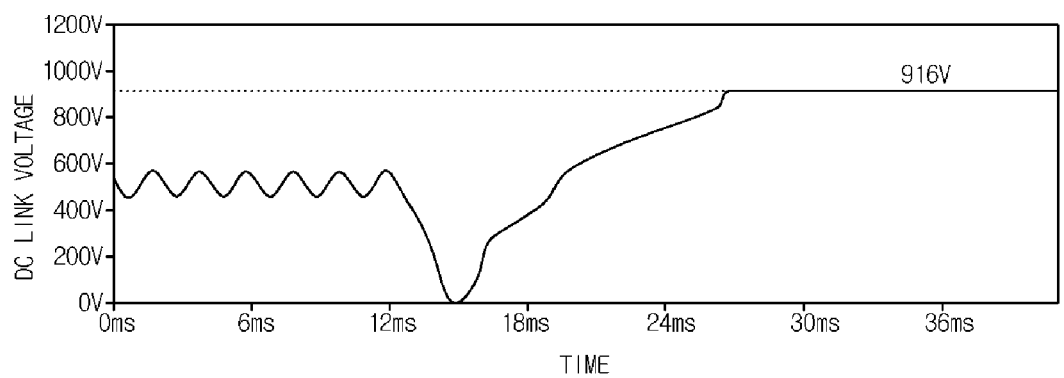
FIG. 13 shows an example of the voltage of the DC link in the inverter circuit to which the second embodiment is not applied.

FIG. 13 shows an example of the voltage of the DC link 4 in the inverter circuit 100 to which the second embodiment is not applied. The inverter circuit 100 to which the second embodiment is not applied may include no suppressor 6B of the inverter circuit 100 shown in FIG. 10 (FIG. 11).

As shown in FIG. 12, the motor M may stop suddenly at time of 12 ms. Then, the DC link voltage may be lowered sharply, and then rise by induced electromotive current. Thereafter, the DC link voltage may reach 916V.

As described above, the suppressor 6B of the inverter circuit 100 to which the second embodiment is applied may suppress the occurrence of an overvoltage of the DC link 4. Accordingly, it can be possible to prevent the inverter circuit 100 from breaking down since a voltage exceeding a breakdown voltage is applied to the switching elements St, etc. of the inverter 3 in the inverter circuit 100 so that the switching elements St, etc. break down.

Third Embodiment

The suppressor 6A of the inverter circuit 100 according to the first embodiment and the suppressor 6B of the inverter circuit 100 according to the second embodiment may suppress the occurrence of an overvoltage of the DC link 4.

A suppressor 6 of an inverter circuit 100 according to a third embodiment may suppress an overvoltage generated by inrush current flowing to the smoothing condenser Cs when power is applied to the inverter circuit 100.

Also, the suppressor 6 of the inverter circuit 100 according to the third embodiment may suppress harmonic current in source current.

Figure 14:
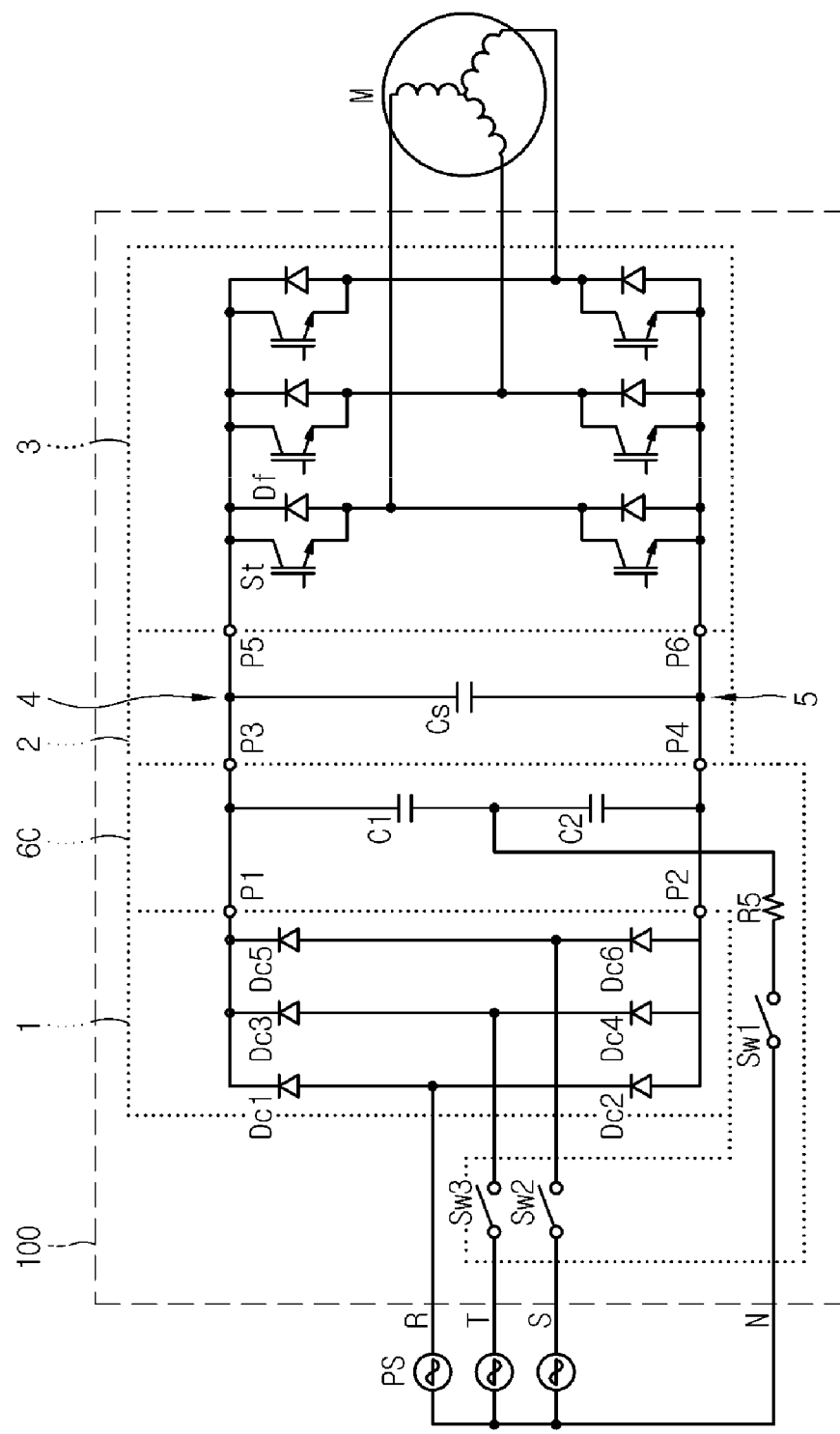
FIG. 14 shows an example of the inverter circuit to which the third embodiment is applied.

FIG. 14 shows an example of the inverter circuit 100 to which the third embodiment is applied.

The inverter circuit 100 according to the third embodiment may include a suppressor 6C as the suppressor 6 of FIG. 1. The same components as those of the inverter circuit 100 shown in FIG. 1 to which the first embodiment is applied are assigned the same reference numerals, and detailed descriptions thereof will be omitted. Hereinafter, the suppressor 6C will be described.

Also, the three-phase AC power source PS may be a three-phase four-wire type, wherein the three phases are an R-phase, a S-phase, and a T-phase, and a neutral point (a neutral line) is referred to as a N-phase. Also, six rectifier diodes Dc of the rectifier 1 are referred to as rectifier diodes Dc1 to Dc6.

The suppressor 6C of the inverter circuit 100 according to the third embodiment may include condensers C1 and C2, switches Sw1, Sw2, and Sw3, and a current-limiting resistor R5.

The condensers C1 and C2 may be connected in series to each other to configure a series circuit, wherein one terminal of the condensers C1 and C2 may be connected to the DC link 4, and the other end of the condensers C1 and C2 may be connected to the common potential line 5. Also, a connection point of the condensers C1 and C2 may be connected to one terminal of the current-limiting resistor R5. The other terminal of the current-limiting resistor R5 may be connected to one terminal of the switch Sw1, and the other terminal of the switch Sw1 may be connected to the N-phase of the three-phase AC power source PS.

Also, the switch Sw2 may be disposed between the S-phase of the three-phase AC power source PS and the rectifier 1, and the switch Sw3 may be disposed between the T-phase and the rectifier 1.

For example, the line-to-line voltage of the three-phase AC power source PS may be 400V, the capacitance of the smoothing condenser Cs may be 40 µF, and the capacitance of each of the condensers C1 and C2 may be 0.22 µF. Also, the resistance of the current-limiting resistor R5 may be 800Ω.

The switch Sw1 may be an example of a second switch, and the switches Sw2 and Sw3 may be examples of a first switch.

<Suppression of Overvoltage Generated by Inrush Current>

Hereinafter, a process in which an overvoltage generated by inrush current is suppressed in the inverter circuit 100 to which the third embodiment is applied will be described.

When power is applied to the inverter circuit 100, the switch Sw1 may be closed (turned on), and the switches Sw2 and Sw3 may be opened (turned off). Then, the three-phase AC power source PS may be turned on.

Then, the condensers C1 and C2 may be charged trough the R-phase of the three-phase AC power source PS. That is, when the R-phase is at a positive (+) phase, the condenser C1 may be charged through the rectifier diode Dc1. Meanwhile, when the R-phase is at a negative (−) phase, the condenser C2 may be charged through the rectifier diode Dc2. That is, when the R-phase is at the positive (+) phase, the rectifier diode Dc2 may be connected in the reverse direction, so that only the condenser C1 is shown from the R-phase of the three-phase AC power source PS. In contrast, when the R-phase is at the negative (−) phase, the rectifier diode Dc1 may be connected in the reverse direction, so that only the condenser C2 is shown from the R-phase of the three-phase AC power source PS.

Also, when the condenser C1 is charged, the smoothing condenser Cs may be charged by charges accumulated in the condenser C2. In contrast, when the condenser C2 is charged, the smoothing condenser Cs may be charged by charges accumulated in the condenser C1.

Thereafter, after the smoothing condenser C2 is charged to a predetermined voltage, the switch Sw1 may be closed (turned off), and simultaneously, the switches Sw2 and Sw3 may be opened (turned on).

Also, when a predetermined time period elapses after the three-phase AC power source PS is turned on, the switch Sw1 may be closed (turned off), and simultaneously, the switches Sw2 and Sw3 may be opened (turned on).

Accordingly, the inverter circuit 100 may return to its normal operation state.

In the inverter circuit 100 to which the third embodiment is applied, the condenser C1 and the condenser C2 may be charged alternately by the R-phase of the three-phase AC power source PS. Also, the smoothing condenser Cs may be slowly charged by charges accumulated in the charged condensers C1 and C2. By repeatedly performing the operation, the smoothing condenser Cs may be charged.

That is, the circuit configured with the switch Sw1 and the current-limiting resistor R5 may be a charging circuit.

Meanwhile, if the inverter circuit 100 includes no suppressor 6C, the three-phase AC power source PS may be turned on so that current for charging the smoothing condenser Cs flows. The current is referred to as inrush current, and the inrush current may be large at the larger capacitance of the smoothing condenser Cs. If the inrush current is large, the rectifier diode Dc of the rectifier 1 may break down. Accordingly, it is necessary to suppress current which may break the rectifier diode Dc of the rectifier 1, as overcurrent.

In regard of this, in the inverter circuit 100 according to the third embodiment, the capacitance of the condenser C1 and the condenser C2 may be set to be smaller than the capacitance of the smoothing condenser Cs. Also, the current-limiting resistor R5 may be provided. Accordingly, inrush current flowing to the inverter circuit 100 from the R-phase of the three-phase AC power source PS may be reduced and suppressed. Accordingly, it is possible to prevent the rectifier diode Dc of the rectifier 1 from breaking down by overcurrent, thereby preventing the inverter circuit 100 from breaking down.

Also, it can be considered that the smoothing condenser Cs, instead of the condenser C1 and the condenser C2, is configured with a series circuit of two condensers. However, the capacitance of each of the condenser C1 and the condenser C2 becomes twice that of the smoothing condenser Cs, resulting in enlargement. Large inrush current may flow to each of the condenser C1 and the condenser C2 from the R-phase of the three-phase AC power source PS.

Also, if the line-to-line voltage of the three-phase AC power source PS is 400V, a voltage of 230V may be applied between the N-phase, the R-phase, the S-phase, and the T-phase. Accordingly, the switches Sw1, Sw2, and Sw3 may use a low-cost small relay that is widely used in 200V series, instead of a high-cost large relay corresponding to 400V. Accordingly, the inverter circuit 100 can be manufactured with a compact size at low costs.

Also, if the condensers C1 and C2 having small capacitance are used, compared to the case in which the smoothing condenser Cs is configured with a series circuit of two condensers, the inverter circuit 100 can be manufactured with a compact size.

<Suppression of Harmonic Current>

As described above, the inverter circuit 100 to which the first embodiment is applied can suppress harmonic current in source current.

The inverter circuit 100 to which the third embodiment is applied can suppress harmonic current in source current, as described above. The series circuit of the condensers C1 and C2 in the suppressor 6C of the inverter circuit 100 may be connected in parallel to the smoothing condenser Cs. Accordingly, the condensers C1 and C2 may also function as smoothing condensers, like the smoothing condenser Cs.

Figure 15A:
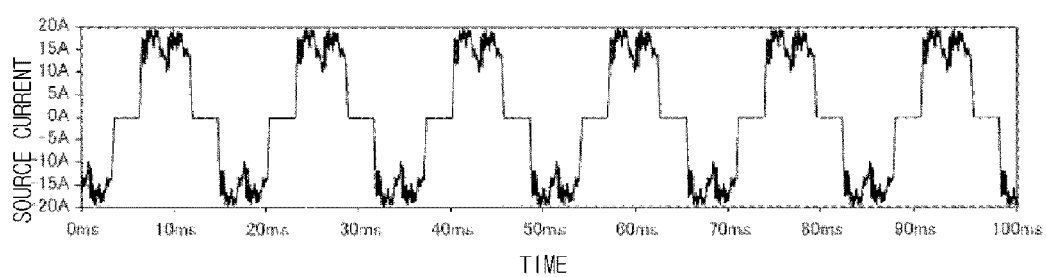
FIG. 15(a) shows source current for the inverter circuit to which the third embodiment is applied.
Figure 15B:
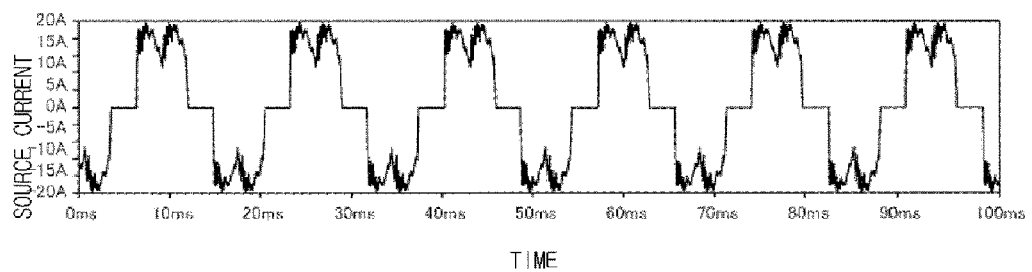
FIG. 15(b) shows source current for the inverter circuit to which the third embodiment is not applied.

FIG. 15 shows source current for the inverter circuit 100 to which the third embodiment is applied. FIG. 15(*a*) shows source current for the inverter circuit 100 to which the third embodiment is applied, and FIG. 15(b) shows source current for the inverter circuit 100 to which the third embodiment is not applied.

The inverter circuit 100 shown in FIG. 15(a) to which the third embodiment is applied may be the inverter circuit 100 shown in FIG. 14. The capacitance of the smoothing condenser Cs may be 10 µF, and the capacitance of each of the condensers C1 and C2 may be 20 µF. That is, the total capacitance of the smoothing condenser Cs and the condensers C1 and C2 may be 20 µF. Also, the resistance of the current-limiting resistor R5 may be 25Ω.

Meanwhile, the inverter circuit 100 shown in FIG. 15(b) to which the third embodiment is not applied may be the inverter circuit 100 shown in FIG. 14, from which the suppressor 6C is removed. The capacitance of the smoothing condenser Cs may be 20 µF.

That is, the DC link 4 may have the same capacitance of 20 µF.

Also, the inverter circuit 100 to which the third embodiment is applied and the inverter circuit 100 to which the third embodiment is not applied may include a DC reactor between the rectifier 1 and the suppressor 6. The reactance of the DC reactor may be 75 µH.

Comparing the source current of FIG. 15(a) to the source current of FIG. 15(b), the source current of FIG. 15(a) may have a smaller variation in amplitude than the source current of FIG. 15(b).

Table 2 shows values (Ih/Iref) obtained by subtracting a harmonic current spectrum amplitude Ih from a current spectrum amplitude Iref of a source frequency (h=1). Herein, the inverter circuit 100 to which the third embodiment is applied and the inverter circuit 100 to which the third embodiment is not applied are shown. Also, Table 2 shows THC and PWHC.

TABLE 2

| h | Inverter Circuit to which Third Embodiment Is Applied | Inverter Circuit to which Third Embodiment Is Not Applied |
|---|---|---|
| 2 | 0.3% | 0.1% |
| 4 | 0.1% | 0.1% |
| 5 | 27.0% | 28.7% |
| 6 | 0.0% | 0.0% |
| 7 | 5.5% | 5.9% |
| 8 | 0.2% | 0.1% |
| 10 | 0.2% | 0.1% |
| 11 | 8.6% | 9.4% |
| 12 | 0.0% | 0.0% |
| 13 | 3.9% | 4.2% |
| THC | 30.7% | 32.4% |
| PWHC | 42.7% | 45.7% |

In the inverter circuit 100 to which the third embodiment is applied, I5/Iref, I11/Iref, and I12/Iref may be improved, compared to the inverter circuit 100 to which the third embodiment is not applied. Accordingly, THC and PWHC may be improved.

That is, although the capacitance of the DC link 4 is the same, in the case of disposing the series circuit of the condensers C1 and C2 in parallel to the smoothing condenser Cs, THC, etc. can be improved.

<Modified Example of the Inverter Circuit 100 to which the Third Embodiment is Applied>

Hereinafter, a modified example of the inverter circuit 100 to which the third embodiment is applied will be described.

The inverter circuit 100 shown in FIG. 14 may be connected to the three-phase AC power source PS of a three-phase four-wire type. An inverter circuit 100 according to a modified example may be connected to a three-phase AC power source PS of a three-phase four-wire type.

Figure 16:
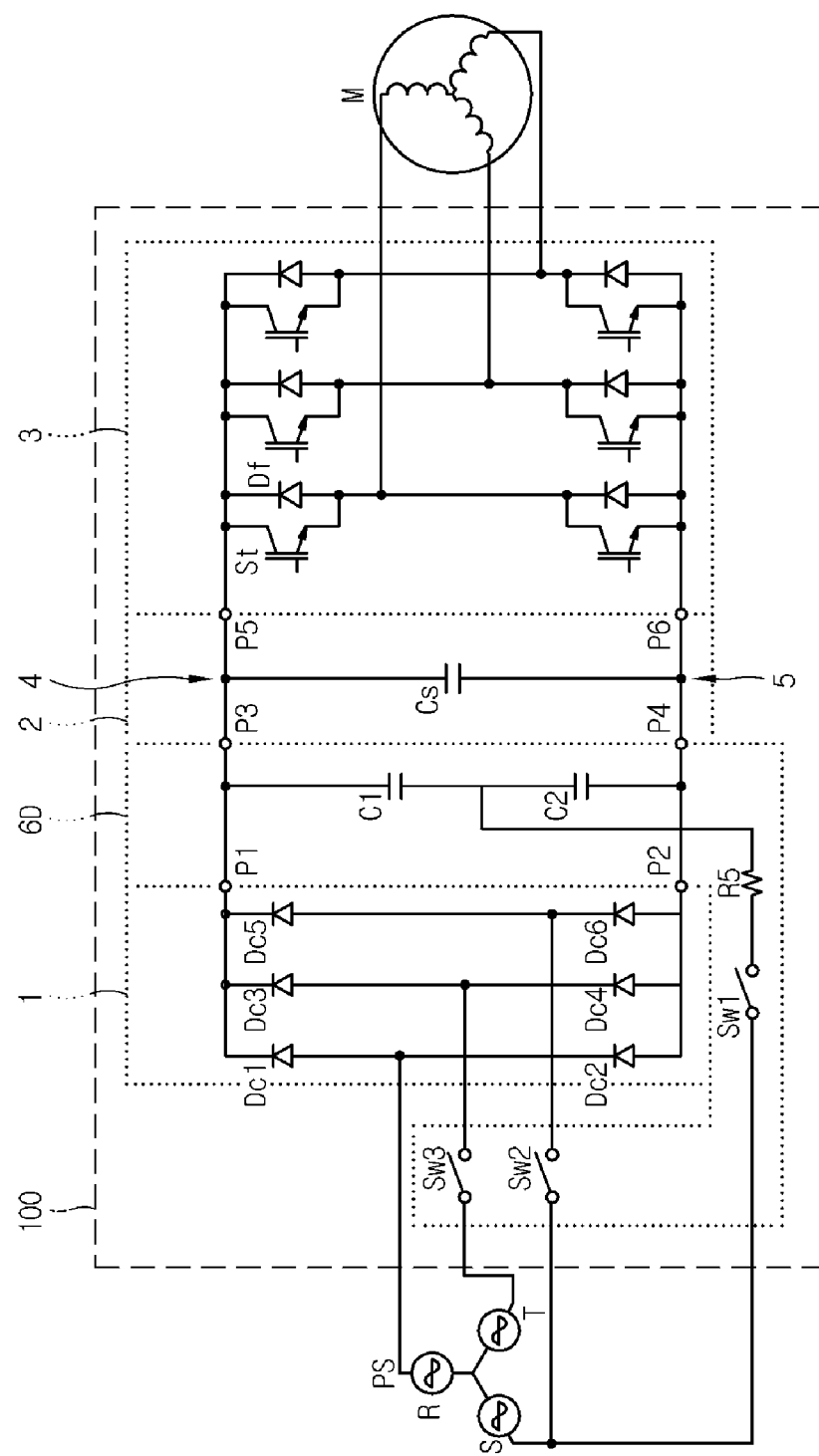
FIG. 16 shows a modified example of the inverter circuit to which the third embodiment is applied.

FIG. 16 shows a modified example of the inverter circuit 100 to which the third embodiment is applied.

In the inverter circuit 100 according to the modified example, a switch Sw1 may be connected to the S-phase of the three-phase AC power source PS. Also, no N-phase may be used.

For example, the line-to-line voltage of the three-phase AC power source PS may be 200V, the capacitance of the smoothing condenser Cs may be 40 µF, and the capacitance of each of the condensers C1 and C2 may be 0.22 µF. Also, the resistance of the current-limiting resistor R5 may be 800Ω.

When power is applied to the inverter circuit 100, the switch Sw1 may be closed (turned on), and the switches Sw2 and Sw3 may be opened (turned off). Then, the three-phase AC power source PS may be turned on. Then, when the line-to-line voltage of the R-phase and the S-phase is at a positive (+) phase, the condenser C1 may be charged, and when the line-to-line voltage of the R-phase and the S-phase is at a negative (+) phase, the condenser C2 may be charged. The following operation may be the same as that of the inverter circuit 100 of the three-phase four-wire type shown in FIG. 14, and accordingly, a detailed description thereof will be omitted.

Also, the switch Sw1 may need to connect to any one of the S-phase in which the switch Sw2 is installed or the T-phase in which the switch Sw3 is installed. As understood from FIG. 16, although the switch Sw1 is connected to the R-phase, no voltage may be applied to the condensers C1 and C2.

In the modified example of the inverter circuit 100 shown in FIG. 16 to which the third embodiment is applied, likewise, the suppressor 6 may suppress overcurrent when power is applied to the inverter circuit 100. Accordingly, it is possible to prevent the inverter circuit 100 from breaking down. Also, the suppressor 6 may suppress harmonic current in power current.

The inverter circuit 100 to which the third embodiment is applied has been described above. The DC reactor Ldc shown in FIG. 3 may be disposed between the suppressor 6 and the rectifier 1 of the inverter circuit 100 shown in FIG. 14 to which the third embodiment is applied. Also, the third embodiment may be combined with the first embodiment or the second embodiment. The modified example of the inverter circuit 100 shown in FIG. 16 to which the third embodiment is applied may also be combined with the first embodiment or the second embodiment.

In the first to third embodiments, the load of the inverter circuit 100 is the motor M, but, the inverter circuit 100 may include another load. In the case of an inductive load (a load having a high reactance component), the effect can increase.

Also, in the first to third embodiments, a three-phase type has been described, however, the suppressor 6A, 6B, or 6C may be applied to the inverter circuit 100 of connecting a single-phase AC power source to a load such as a single-phase motor.

In the first to third embodiments, since the inverter circuit 100 uses devices having the above-described reactance, capacitance, and resistance, the inverter circuit 100 can be manufactured with a small size.

The inverter circuit disclosed in the present disclosure can be applied to a compressor of an air conditioner and a refrigerator. More specifically, the inverter circuit described in the embodiments of the present disclosure may be applied to supply power to a load such as a motor used in a compressor of an air conditioner or a compressor of a refrigerator. The inverter circuit may convert (rectify) an AC voltage supplied from an AC power source into a DC voltage, smoothen the DC voltage, and then convert the DC voltage into an AC voltage suitable for controlling a load. Thereby, the air conditioner and the refrigerator to which the inverter circuit is applied can prevent the occurrence of an overvoltage or overcurrent at an area (DC link) to which a DC voltage is applied.

It will be apparent to those skilled in the art that various modifications or combinations of the embodiments can be made in the present invention without departing from the spirit or scope of the invention.

The invention claimed is:

1. An apparatus comprising:
    an inverter circuit including:
        a rectifier configured to rectify an input Alternating-Current (AC) voltage into a Direct-Current (DC) voltage;
        a smoothing portion configured to smoothen the DC voltage output from the rectifier;
        an inverter connected to a load and configured to convert the DC voltage smoothened by the smoothing portion into an output AC voltage and to output the output AC voltage to the load; and
        a suppressor installed between the rectifier and the smoothing portion, and configured to suppress an overvoltage or overcurrent of a DC link to which the DC voltage from the smoothing portion is applied,
    wherein the smoothing portion includes a first input terminal, and a second input terminal connected to a common potential line, and
    the suppressor includes:
        a series circuit of a control switch device and a surge absorber connected between the first input terminal of the smoothing portion and the common potential line, and
        an overvoltage detection circuit configured to detect the overvoltage when a voltage of the DC link reaches to the overvoltage and to turn on the control switch device when the overvoltage is detected, and
        wherein a discharge start voltage of the surge absorber is smaller than the voltage of the DC link detected as the overvoltage by the overvoltage detection circuit.

2. The apparatus according to claim 1, wherein
the rectifier comprises a first output terminal, and a second output terminal connected to the common potential line to set the common potential, and the suppressor comprises a DC reactor installed between the first output terminal of the rectifier and the first input terminal of the smoothing portion, and a series circuit of a resistor and a condenser connected in parallel to the DC reactor.

3. The apparatus according to claim 1, wherein the surge absorber of the suppressor is a varistor.

4. The apparatus according to claim 1, wherein the overvoltage detection circuit comprises:
    a first resistor and a second resistor, connected in series between the DC link and the common potential line;
    a transistor, a third resistor, and a fourth resistor, connected in series between a driving power source and the common potential line;
    an amplifier having a positive (+) input terminal connected to a connection point of the first resistor and the second resistor, and an output terminal connected to the transistor; and
    the overvoltage detection circuit configured with a reference power source connected between a negative (−) input terminal of the amplifier and the common potential line.

5. The apparatus according to claim 4, wherein the driving power source drives the amplifier.

6. The apparatus according to claim 1,
    wherein the apparatus is an air conditioner including a compressor, and the compressor includes the inverter circuit.

7. The apparatus according to claim 1,
    wherein the apparatus is a refrigerator including a compressor, the compressor includes the inverter circuit.

8. An apparatus including an inverter circuit, connected to a three-phase AC power source including an R-phase, a S-phase, a T-phase, and a neutral point, the inverter circuit comprising:
    a rectifier configured to rectify an input Alternating-Current (AC) voltage into a Direct-Current (DC) voltage;
    a smoothing portion configured to smoothen the DC voltage output from the rectifier;
    an inverter connected to a load and configured to convert the DC voltage smoothened by the smoothing portion into an output AC voltage, and to output the output AC voltage to the load; and
    a suppressor installed between the rectifier and the smoothing portion, and configured to suppress an overvoltage or overcurrent of a DC link to which the DC voltage from the smoothing portion is applied, the suppressor including:
        a series circuit of a first condenser and a second condenser, connected in parallel to the smoothing portion;
        a first switch installed between the rectifier and each of the S-phase and the T-phase of the three-phase AC power source; and
        a series circuit of a second switch and a current-limiting resistor, connected to a connection point of the first condenser and the second condenser in the series circuit, and the neutral point of the three-phase AC power source.

9. The apparatus according to claim 8, wherein the smoothing portion comprises a smoothing condenser, and the capacitance of the first condenser and the second condenser is smaller than the capacitance of the smoothing condenser.

10. An apparatus including an inverter circuit connected to a three-phase AC power source including an R-phase, a S-phase, and a T-phase, the inverter circuit comprising:
    a rectifier configured to rectify an input Alternating-Current (AC) voltage into a Direct-Current (DC) voltage;
    a smoothing portion configured to smoothen the DC voltage output from the rectifier;
    an inverter connected to a load and configured to convert the DC voltage smoothened by the smoothing portion into an output AC voltage, and to output the output AC voltage to the load; and
    a suppressor installed between the rectifier and the smoothing portion, and configured to suppress an overvoltage or overcurrent of a DC link to which the DC voltage from the smoothing portion is applied, the suppressor including:
        a series circuit of a first condenser and a second condenser, connected in parallel to the smoothing portion;

a first switch installed between the rectifier and each of a S-phase and a T-phase of the three-phase AC power source; and a series circuit of a second switch and a current-limiting resistor, connected to any one of the S-phase and the T-shape and a connection point of the first condenser and the second condenser in the series circuit.

* * * * *